(12) United States Patent
Myers et al.

(10) Patent No.: US 10,324,600 B2
(45) Date of Patent: Jun. 18, 2019

(54) WEB PAGE GENERATION SYSTEM

(71) Applicant: ADP, LLC, Roseland, NJ (US)

(72) Inventors: Clint Myers, Suwanee, GA (US); Amit Kumar Sharma, Hyderabad (IN); Vinay Shankri, Branchburg, NJ (US); Siju Varghese, Lake Hiawatha, NJ (US)

(73) Assignee: ADP, LLC, Roseland, NJ (US)

( * ) Notice: Subject to any disclaimer, the term of this patent is extended or adjusted under 35 U.S.C. 154(b) by 626 days.

(21) Appl. No.: 14/809,780

(22) Filed: Jul. 27, 2015

(65) Prior Publication Data

US 2017/0031878 A1    Feb. 2, 2017

(51) Int. Cl.
*G06F 17/20* (2006.01)
*G06F 3/0484* (2013.01)
*G06F 16/958* (2019.01)

(52) U.S. Cl.
CPC ........ *G06F 3/04845* (2013.01); *G06F 16/972* (2019.01)

(58) Field of Classification Search
CPC ............ G06F 3/04845; G06F 3/04842; G06F 3/0482; G06F 17/3089
See application file for complete search history.

(56) References Cited

U.S. PATENT DOCUMENTS

| | | | |
|---|---|---|---|
| 5,821,937 A | 10/1998 | Tonelli et al. | |
| 6,035,119 A | 3/2000 | Massena et al. | |
| 6,151,624 A | 11/2000 | Teare et al. | |
| 6,336,138 B1 | 1/2002 | Caswell et al. | |
| 6,606,744 B1 | 8/2003 | Mikurak | |
| 6,629,081 B1 | 9/2003 | Cornelius et al. | |
| 6,883,142 B2 | 4/2005 | Shimamoto et al. | |
| 7,013,289 B2 | 3/2006 | Horn et al. | |
| 7,162,687 B2 | 1/2007 | Pelegri-Llopart et al. | |

(Continued)

FOREIGN PATENT DOCUMENTS

| | | |
|---|---|---|
| WO | 2007076459 A2 | 7/2007 |
| WO | 2013078041 A1 | 5/2013 |
| WO | 2013137982 A1 | 9/2013 |

OTHER PUBLICATIONS

Kiciman et al., "Remotely Monitoring Client-Side Web App Performance and Behavior," Microsoft, Microsoft Research, copyright 2015, 7 pages, accessed Nov. 17, 2015. http://research.microsoft.com/en-us/projects/ajaxview/ajaxviewusage.aspx.

(Continued)

*Primary Examiner* — Mohammed H Zuberi
(74) *Attorney, Agent, or Firm* — Yee & Associates, P.C.

(57) ABSTRACT

A method for displaying a web page. Metadata describing the web page is received. The metadata defines what the web page looks like without content for the web page, the metadata defines a group of objects in the web page, and an object in the group of objects has a function that meets a policy for a political unit. The content needed for the web page based on the metadata is identified. The content for the web page is obtained. The web page is created using the metadata and the content. The web page is displayed on a graphical user interface on a display system, enabling a reduction in resources at a web server that are used to display the web page, enabling a reduction in resources used to display the web page.

28 Claims, 25 Drawing Sheets

(56) References Cited

U.S. PATENT DOCUMENTS

| | | | |
|---|---|---|---|
| 7,165,041 B1 | 1/2007 | Guheen et al. | |
| 7,536,641 B2 | 5/2009 | Rosenstein et al. | |
| 7,644,107 B2 | 1/2010 | Neagovici-Negoescu et al. | |
| 7,831,693 B2 | 11/2010 | Lai | |
| 7,853,884 B2 | 12/2010 | Olander et al. | |
| 7,917,846 B2 | 3/2011 | Decker et al. | |
| 8,171,415 B2 | 5/2012 | Appleyard et al. | |
| 8,326,889 B2 | 12/2012 | Kaisermayr | |
| 8,346,929 B1 | 1/2013 | Lai | |
| 8,370,420 B1 | 2/2013 | Decasper et al. | |
| 8,554,630 B2 | 10/2013 | Grant et al. | |
| 8,775,321 B1 | 7/2014 | Mooneyham | |
| 8,775,923 B1* | 7/2014 | Kroeger | G06F 16/9574 715/234 |
| 8,838,555 B2 | 9/2014 | Von Kaenel et al. | |
| 8,868,533 B2 | 10/2014 | Powell et al. | |
| 9,699,142 B1 | 7/2017 | Allen | |
| 2002/0099738 A1 | 7/2002 | Grant | |
| 2003/0033179 A1 | 2/2003 | Katz et al. | |
| 2007/0156726 A1 | 7/2007 | Levy | |
| 2007/0180364 A1* | 8/2007 | Kobayashi | G06F 17/211 715/210 |
| 2007/0192352 A1 | 8/2007 | Levy | |
| 2007/0208711 A1 | 9/2007 | Rhoads et al. | |
| 2008/0139191 A1* | 6/2008 | Melnyk | H04L 67/2823 455/419 |
| 2009/0292984 A1* | 11/2009 | Bauchot | G06Q 30/02 715/234 |
| 2009/0313579 A1 | 12/2009 | Poulson | |
| 2010/0070448 A1 | 3/2010 | Omoigui | |
| 2010/0146112 A1* | 6/2010 | Shachann | H04L 43/18 709/224 |
| 2010/0174774 A1 | 7/2010 | Kern et al. | |
| 2010/0241518 A1 | 9/2010 | McCann | |
| 2010/0251126 A1 | 9/2010 | Krishnamurthy | |
| 2010/0262780 A1* | 10/2010 | Mahan | G06F 15/16 711/118 |
| 2010/0268694 A1 | 10/2010 | Denoue et al. | |
| 2010/0306643 A1* | 12/2010 | Chabot | G06F 16/95 715/234 |
| 2010/0313149 A1* | 12/2010 | Zhang | G06F 16/972 715/760 |
| 2011/0055699 A1* | 3/2011 | Li | G06F 16/951 715/709 |
| 2011/0066732 A1* | 3/2011 | Iwade | G06F 16/9577 709/227 |
| 2011/0066733 A1* | 3/2011 | Hashimoto | G06F 16/9574 709/227 |
| 2011/0110568 A1 | 5/2011 | Vesper et al. | |
| 2011/0252138 A1 | 10/2011 | Ahuja et al. | |
| 2011/0258173 A1 | 10/2011 | Ratiner et al. | |
| 2011/0289393 A1* | 11/2011 | Choi | G06F 16/957 715/205 |
| 2012/0054599 A1* | 3/2012 | Nixon | G05B 19/4183 715/236 |
| 2012/0159430 A1 | 6/2012 | Waldbaum et al. | |
| 2012/0260157 A1* | 10/2012 | Zhu | H04L 67/1095 715/234 |
| 2013/0132466 A1 | 5/2013 | Miller et al. | |
| 2013/0138426 A1 | 5/2013 | DelRocco et al. | |
| 2013/0179774 A1* | 7/2013 | Wang | G06F 17/22 715/234 |
| 2013/0346873 A1 | 12/2013 | Vasudev et al. | |
| 2014/0195557 A1 | 7/2014 | Oztaskent et al. | |
| 2014/0223306 A1 | 8/2014 | McIntosh et al. | |
| 2014/0337707 A1* | 11/2014 | Choi | G06F 16/9577 715/234 |
| 2015/0193401 A1* | 7/2015 | Kim | G06F 16/9577 715/234 |
| 2015/0339268 A1* | 11/2015 | Bednarz, Jr. | G06F 16/986 715/248 |
| 2015/0378575 A1 | 12/2015 | Kaplinger et al. | |
| 2016/0026611 A1* | 1/2016 | Liu | G06F 17/218 715/234 |
| 2016/0149988 A1 | 5/2016 | Pang | |
| 2017/0031876 A1 | 2/2017 | Myers et al. | |
| 2017/0031877 A1 | 2/2017 | Myers et al. | |
| 2017/0031882 A1 | 2/2017 | Myers et al. | |

OTHER PUBLICATIONS

Myers, "Web Page Profiler," U.S. Appl. No. 14/943,951, filed Nov. 17, 2015, 99 pages.

Moth, "HTML UI Responsiveness tool in Visual Studio 2013", Microsoft DevOps Blog, Jul. 16, 2013, 15 pages. https://blogs.msdn.microsoft.com/devops/2013/07/16/html-ui-responsiveness-tool-in-visual-studio-2013/.

"Analyze Trace", Tideways, Jun. 19, 2015, 9 pages. https://tideways.io/profiler/docs/profiler/analyze-trace.

Davies "Using the Chrome web developer tools, Part 4: The Timeline Tab", Command Line Fanatic Blog, Jan. 31, 2017, 14 pages. http://commandlinefanatic.com/cgibin/showarticle.cgi?article=art036.

Office Action, dated Jun. 30, 2017, regarding U.S. Appl. No. 14/809,717, 29 pages.

Final Office Action, dated Jul. 27, 2017, regarding U.S. Appl. No. 14/809,686, 14 pages.

Office Action, dated Aug. 28, 2017, regarding U.S. Appl. No. 14/943,951, 31 pages.

Myers et al., "Web Page Design System," U.S. Appl. No. 14/809,717, filed Jul. 27, 2015, 81 pages.

Myers et al., "Web Page Generation System," U.S. Appl. No. 14/809,686, filed Jul. 27, 2015, 77 pages.

Office Action, dated Jan. 30, 2017, regarding U.S. Appl. No. 14/809,686, 24 pages.

Final Office Action, dated Feb. 12, 2018, regarding U.S. Appl. No. 14/943,951, 22 pages.

Final Office Action, dated Nov. 2, 2017, regarding U.S. Appl. No. 14/809,717, 18 pages.

Office Action, dated Oct. 9, 2018, regarding U.S. Appl. No. 14/943,951 15 pages.

Osmani, "Improving Web App Performance With the Chrome DevTools Timeline and Profiles," Dec. 9, 2012, 14 pages. https://addyosmani.com/blog/performance-optimisation-with-timeline-profiles/.

Final Office Action, dated Feb. 26, 2019, regarding U.S. Appl. No. 14/809,686, 16 pages.

* cited by examiner

| View | | Country | Role | Locale | Utilize Stubs |
|---|---|---|---|---|---|
| CareerCenter ▼ | 🔍 ⊕ —820 | Default ▼ | Employee ▼ | English ▼ | ☑ |

Design | Preview | Source

```
271   },
272   {
273     "id": 2,
274     "cells": [
275       {
276         "componentId": "COMPONENT_VIEW_1415374498278",
277         "displayType": "VIEW",
278         "id": 0,
279         "labelPosition": "TOP",
280         "labelAlign": "TOP",
281         "positionElementsInGroup": "H",
282         "fieldId": "CareerSearch",
283         "deferredDisplay": true,
284         "minRowsPerPage": 25,
285         "farOffRemoval": 2000,
286         "pagingDelay": 15,
287         "options": {
288           "list": [ ]
289         },
290         "reference": "this.data",
291         "hidden": false,
292         "view": "CareerSearch",
293         "parentStyleClass": "",
294         "parentStyleInline": "",
295         "readOnlyWhen": {
296           "roles": [ ]
```

⟵ 1202

⊖ DELETE | ✏ STYLES | ⧗ RULES | ◈ COMPONENTS | ✦ SERVICES | 🔍 TRANSLATIONS

💾 SAVE

FIG. 12

WEB PAGE GENERATION SYSTEM

CROSS-REFERENCE TO RELATED APPLICATIONS

This application is related to the following U.S. patent applications: U.S. Ser. No. 14/809,717, entitled "Web Page Design System", and U.S. Ser. No. 14/809,686, entitled "Web Page Generation System", each of which is filed even date hereof, assigned to the same assignee, and incorporated herein by reference.

BACKGROUND INFORMATION

1. Field

The present disclosure relates generally to an improved computer system and, in particular, to a method and apparatus for generating pages. Still more particularly, the present disclosure relates to a method and apparatus for generating web pages for display on a browser.

2. Background

The Internet is a global system of interconnected computer networks. The Internet is commonly used to access information resources and services. These information resources and services include documents and applications. In particular, the World Wide Web is an information system accessed via the Internet. This information system is a collection of documents that are linked to each other. These documents are called web pages.

The web pages may be accessed through an application called a web browser on a computer. This application facilitates retrieving, presenting, and traversing information using web pages. A web page may include text, images, video, multimedia components, or other information. In addition, the web page navigation components are in the form of hyperlinks which are often referred to as just links.

A web page may have fixed content and dynamic content. The fixed content may be particular areas in the web page. The dynamic content may be advertisements. In another example, the dynamic content may be information requested by the user. For example, a user may send a request to view banking transactions, current balances, order histories, and other information that may be specific to the user.

Currently, a user requests a web page by selecting a link on a current web page, entering a universal resource locator, or through some other action using a browser. The requested web page is typically generated by a Web page server in a remote location and sent to the browser.

For example, the requested web page may be generated using hypertext markup language (HTML), cascading style sheets (CSS), and Java code for the web page. The hypertext markup language may define static content for the web page. The cascading style sheets describe the look and formatting for the web page. The Java code may be used to generate dynamic content for the web page. The generation of the dynamic content may be performed using a Java service page (JSP) servlet located on the web page server. This dynamically generated web page is then returned to the browser.

The generation of the web pages uses resources on the web page server. For example, the web page server interprets the markup language, scripts, and other code for the web page to generate the web page that is sent to the browser for display. If the amount of traffic on a web page server is high enough, the generation of the web page and sending the web page to the browser may take more time than desired.

For example, a web page server for a popular website may have requests in the thousands per second or tens of thousands per second during high levels of traffic at the website. With this level of traffic, requests may be handled by multiple web page servers to avoid undesired levels of response times for web pages.

Additionally, a web page may have many different versions of a web page. Each version may be a separate web page for static web pages or content may be present for the different versions for a dynamic web page. The information for these different versions may use more storage space than desired in addition to the processing issues described above.

With the processing resources needed at web servers and the storage space needed for different versions of web pages, the resources needed to generate web pages may be more than available or more expensive than desired. Therefore, it would be desirable to have a method and apparatus that take into account at least some of the issues discussed above, as well as other possible issues. For example, it would be desirable to have a method and apparatus that overcome the technical problems of the large amounts of time and effort needed to provide different versions of web pages to perform operations and insufficient resources for web page servers being present to generate web pages sent to client data processing systems.

SUMMARY

An embodiment of the present disclosure provides a method for displaying a web page. Metadata describing the web page is received by a client data processing system. The metadata defines what the web page looks like without content for the web page, the metadata defines a group of objects in the web page, and an object in the group of objects has a function that meets a policy for a political unit. The content needed for the web page based on the metadata is identified by the client data processing system. The content for the web page is obtained by the client data processing system. The web page is created by the client data processing system using the metadata and the content. The web page is displayed by the client data processing system on a graphical user interface on a display system for the client data processing system, enabling a reduction in resources at a web server that are used to display the web page on the client data processing system, enabling a reduction in resources used to display the web page.

Another embodiment of the present disclosure provides a method for displaying a web page. A graphical object that performs a function for the web page is selected by a data processing system to meet a policy for a political unit. The graphical object is selected based on an identification of the political unit. The web page that has the graphical object in the web page that performs the function is created by the data processing system to meet the policy. The web page is configured to receive a user input from an operator for an operation performed by the operator with respect to the political unit. The web page is displayed on a graphical user interface on a display system for a client data processing system.

Yet another embodiment of the present disclosure provides a client data processing system comprising a display system and a web page generator in communication with the display system. The web page generator receives metadata describing the web page. the metadata defines what the web page looks like without content for the web page, the metadata defines a group of objects in the web page, and an object in the group of objects has a function that meets a policy for a political unit; identifies the content needed for the web page based on the metadata; obtains the content for the web page; creates the web page using the metadata and the content; and displays the web page on a graphical user interface on a display system for the client data processing system, enabling a reduction in resources at a web server that are used to display the web page on the client data processing system, enabling a reduction in resources used to display the web page.

Still another embodiment of the present disclosure provides a computer program product for displaying a web page, the computer program product comprising a computer readable storage media, first program code, second program code, third program code, fourth program code, and fifth program code, stored on the computer readable storage media. The first program code receives metadata describing the web page. the metadata defines what the web page looks like without content for the web page, the metadata defines a group of objects in the web page, and an object in the group of objects has a function that meets a policy for a political unit. The second program code identifies the content needed for the web page based on the metadata. The third program code obtains the content for the web page. The fourth program code creates the web page using the metadata and the content. The fifth program code displays the web page on a graphical user interface on a display system for a client data processing system, enabling a reduction in resources at a web server that are used to display the web page on the client data processing system, enabling a reduction in resources used to display the web page.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 12 is an illustration of a graphical user interface for displaying a source view of a web page in accordance with an illustrative embodiment;

DETAILED DESCRIPTION

The illustrative embodiments recognize and take into account one or more different considerations. For example, the illustrative embodiments recognize and take into account that currently used systems for designing web pages often do not allow a designer to focus on designing a web page as much as desired. The illustrative embodiments recognize and take into account that with currently used web page design systems, a designer often needs to have knowledge about markup languages, Web servers, or other technical areas.

Thus, the illustrative embodiments provide a method and apparatus for designing a web page. In one illustrative example, a method is presented for designing a web page. A computer system displays objects in a graphical user interface in a display system. The objects are selectable for use in designing the web page. The computer system generates metadata for the web page based on a user input selecting a group of the objects for the web page, wherein the metadata describes the web page. The computer system creates a preview of the web page from the metadata and displays the preview of the web page in the graphical user interface in the display system.

Figure 1:
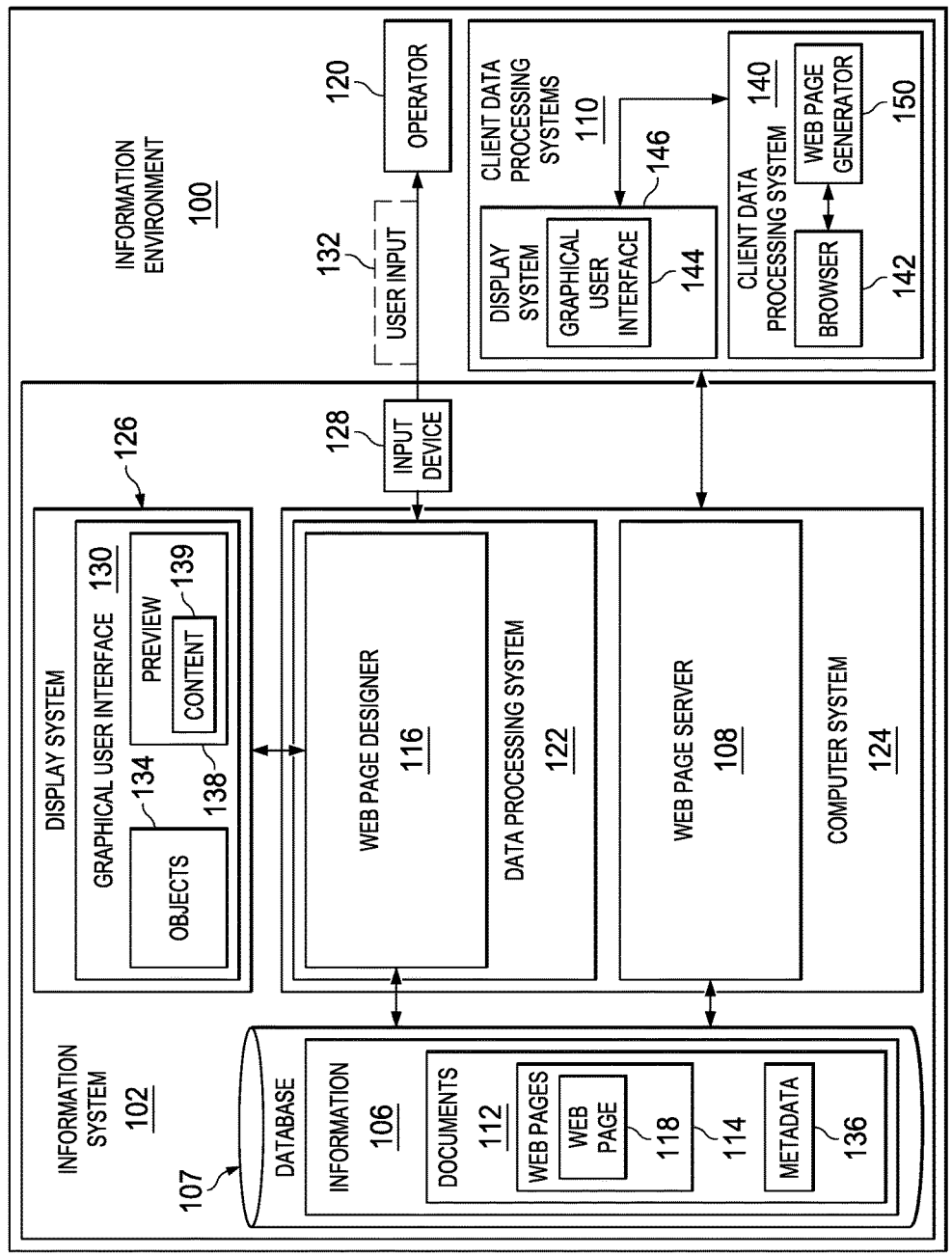
FIG. 1 is an illustration of a block diagram of an information environment in accordance with an illustrative embodiment.

With reference now to the figures and in particular with reference to FIG. 1, an illustration of a block diagram of an information environment is depicted in accordance with an illustrative embodiment. In this illustrative example, information environment 100 includes information system 102. Information system 102 provides access to information 106 stored in database 107. As depicted, database 107 may be a storage system in a single location or may be distributed.

For example, web page server 108 sends information 106 to client data processing systems 110 operated by users. In this illustrative example, client data processing systems 110 are hardware systems that may include software. For example, client data processing systems 110 may be selected from at least one of a computer, a server computer, a workstation, a tablet computer, a laptop computer, a mobile phone, or some other suitable data processing system that may be used by users 104.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, a portion of information 106 takes the form of documents 112. As depicted, documents 112 may be web pages 114 that are displayed on client data processing systems 110.

As depicted, web pages 114 are designed using web page designer 116. For example, web page 118 may be designed by operator 120 interacting with web page designer 116. In this illustrative example, operator 120 is a person, such as a web page designer.

Web page designer 116 may be implemented in software, hardware, firmware or a combination thereof. When software is used, the operations performed by web page designer 116 may be implemented in program code configured to run on hardware, such as a processor unit. When firmware is used, the operations performed by web page designer 116 may be implemented in program code and data and stored in persistent memory to run on a processor unit. When hardware is employed, the hardware may include circuits that operate to perform the operations in web page designer 116.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, web page designer 116 may be implemented in data processing system 122 within computer system 124. Computer system 124 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

In the illustrative example, display system 126 and input device 128 are in communication with data processing system 122. These components aid operator 120 in interacting with web page designer 116.

A display system is a hardware system and includes one or more display devices on which graphical user interface 130 may be displayed. The display devices may include at least one of a light-emitting diode display (LED), a liquid crystal display (LCD), an organic light-emitting diode display (OLED), or some other suitable device on which graphical user interface 130 can be displayed. Operator 120 may interact with graphical user interface 130 through user input 132 generated by input device 128. Input device 128 may be, for example, a mouse, a keyboard, a trackball, a touchscreen, a stylus, or some other suitable type of input device.

In operation, web page designer 116 in data processing system 122 displays objects 134 in graphical user interface 130 in display system 146. As depicted, objects 134 are selectable for use in designing web page 118.

In the illustrative example, an object in objects 134 is used in web page 118. The object may be selected from one of a graphical element, a functional element, a script, a graphical control, or some other object that is used in web page 118. A functional element performs some step, operation, or function. The functional element may not be visible. The functional element may be a script, a plug in, an extension, or some other suitable component.

Web page designer 116 generates metadata 136 for web page 118 based on user input 132 selecting a group of objects 134 for web page 118. As used herein, a "group of," when used with reference to items, means one or more items. For example, a group of objects 134 is one or more of objects 134.

Web page designer 116 may generate metadata 136 in a number different ways. For example, in generating metadata 136, web page designer 116 may perform at least one of creating new data for metadata 136, modifying metadata 136, or some other suitable action. Thus, metadata 136 may be entirely new metadata. In some cases, metadata 136 may be generated from modifying existing metadata.

In this illustrative example, metadata 136 describes web page 118. For example, metadata 136 may describe at least one of what information is to be displayed, how the information is to be displayed, and where the information is to be displayed in web page 118.

In generating metadata 136 for web page 118, web page designer 116 does not generate hypertext markup language or cascading style sheets for web page 118. Web page designer 116 does not generate markup language for web page 118 because web page 118 is described using metadata 136. The markup language may be, for example, hypertext markup language or cascading style sheets.

In the illustrative example, web page designer 116 creates preview 138 of web page 118 from metadata 136. Web page designer 116 displays preview 138 of web page 118 in graphical user interface 130 in display system 126.

Preview 138 is how web page 118 will look when displayed on one of client data processing systems 110. In preview 138, web page 118 may not be complete. As a result, preview 138 may show how web page 118 will look on client data processing systems 110 as currently designed. In other words, preview 138 does not require web page 118 to be completed.

Additionally, preview 138 may include content 139 for web page 118. Also, content 139 used in preview 138 may be in a language that is selected based on one of the location of client data processing system 140 and a user preference for the languages.

As depicted, content 139 is something that is to be expressed in web page 118, as opposed to describing how or what something looks like in web page 118. Content 139 may include at least one of text, images, video, audio, graphics, or other information that is put into web page 118. In contrast, metadata 136 describes what web page 118 looks like. For example, metadata 136 may describe what information is to be displayed, how the information is to be displayed, and where the information is to be displayed in web page 118.

Once web page 118 is completed, web page designer 116 stores web page 118 in database 107 with web pages 114. As depicted, the storage of web page 118 is storing metadata 136 for web page 118. Other ones of web pages 114 also may have metadata 136 that describe how those ones of web pages 114 will look when displayed on client data processing systems 110. In storing metadata 136 in database 107 for web page 118, web page designer 116 does not store markup language for web page 118. Web page designer 116 does not store markup language for web page 118 because web page 118 is described using metadata 136.

Web page designer 116 may retrieve metadata 136 for web page 118 from database 107 after metadata 136 has been saved in database 107. For example, web page designer 116 may retrieve metadata 136 to make modifications to metadata 136 for web page 118. In this manner, operator 120 may modify existing web pages in web pages 114.

In the illustrative example, client data processing system 140 in client data processing systems 110 may access and display web pages 114. For example, after web page 118 is designed using web page designer 116, client data processing system 140 may retrieve metadata 136 for web page 118.

In this illustrative example, metadata 136 for web page 118 may be obtained from web page server 108. Web page server 108 may retrieve metadata 136 for web page 118 from database 107. In this illustrative example, web page server 108 is not used to retrieve markup language for web page 118. Metadata 136 is obtained from web page server 108 because web page 118 is described using metadata 136.

Client data processing system 140 in client data processing systems 110 receives metadata 136 describing web page 118. In this illustrative example, browser 142 in client data processing system 140 displays web page 118. For example, web page 118 is displayed by browser 142 in graphical user interface 144 in display system 146 for client data processing system 140.

In this illustrative example, browser 142 is a program or application. Browser 142 in graphical user interface 144 displays web page 118 in graphical user interface 144 in display system 146. Browser 142 is configured to interpret web pages 114 received from web page server 108 to display web pages 114. For example, browser 142 may interpret markup language, metadata 136, and other information to display web pages 114.

As depicted, metadata 136 defines what web page 118 looks like without content 139 for web page 118. In this illustrative example, client data processing system 140 identifies content 139 needed for web page 118 based on metadata 136. In this illustrative example, content 139 is stored and retrieved from database 107.

As depicted, content 139 may be a portion of information 106 that is displayed in web page 118. The client data processing system obtains content 139 for web page 118.

With content 139, web page generator 150 in client data processing system 140 creates web page 118 using metadata 136 and content 139 without using a markup language. For example, web page generator 150 may create at least one of a document object model data structure for web page 118 or some other suitable type of data structure for web page 118. These data structures generated by web page generator 150 for web page 118 do not have markup language. Markup languages are selected from at least one of hypertext markup languages, cascading style sheets, or other suitable types of markup languages.

Because markup languages may have different versions, these markup languages may not support features described by metadata 136. Using metadata 136 to generate web page 118 without using a markup language may result in a more accurate and uniform representation of web page 118 when displayed on client data processing system 140.

In the illustrative example, web page generator 150 displays web page 118 on graphical user interface 144 in display system 146 for client data processing system 140. The display of web page 118, in this example, does not use browser 142.

In another illustrative example, web page generator 150 may send web page 118 to browser 142. Browser 142 may then display web page 118 without using a markup language.

In still another illustrative example, web page generator 150 may be a module located in browser 142. As a module, web page generator 150 creates web page 118 in browser 142 without using a markup language. Browser 142 may then display web page 118. In other words, web page generator 150 enables browser 142 to display web page 118 that is based on metadata 136 and content 139.

Thus, the illustrative examples provide a method and apparatus for designing web pages. In one illustrative example, a method and apparatus provide one or more technical solutions that overcome the technical problem of the knowledge and experience about web page servers needed to design web pages. In another illustrative example, a method and apparatus provide one or more technical solutions that overcome the technical problem of designing web pages for display on different types of browsers. In the technical solution, the process implemented in web page designer 116 using metadata 136 has a technical effect that avoids operator 120 needing knowledge and experience about web page server 108. Additionally, the technical solution provided by this process has a technical effect of reducing the need for operator 120 to web page 118 on different types of browsers to see whether web page 118 has a desired display on those browsers. Metadata 136 describes web page 118 and is not browser dependent in this illustrative example.

Thus, operator 120 may focus on designing web page 118 rather than identifying differences in the manner in which web page 118 may be displayed on different browsers. Additionally, operator 120 does not need to access or have knowledge or experience about web page server 108. Operator 120 may focus on designing web page 118 for a particular look, feel, function, or other goal.

The illustrative example also solves the technical problem of having sufficient resources for web page servers to generate web pages. In the illustrative example, a technical solution is present in which client data processing system 140 generates web page 118 using metadata 136 for web page 118. Additionally, client data processing system 140 also retrieves content 139 for use in generating web page 118.

The technical effect is reducing resources that are needed for web page server 108. For example, web page server 108 may only send metadata 136 and does not need to use resources to generate web page 118. As a result, times at which web pages 114 are generated with a lower than desired time may be reduced. Further, web pages 114 may be displayed more quickly on client data processing systems 110 even when high levels of traffic are present on web page server 108 in the illustrative example.

For example, current web page servers process the markup language for a web page and find the content for the web page. The current web page servers then send the web page and the content to the browser on the client data processing system to display.

In contrast, web page server 108 sends metadata 136 for web page 118 to client data processing system 140. Web page generator 150 in client data processing system 140 processes metadata 136 to form a visualization for web page 118 that is displayed in graphical user interface 144 in display system 146. Also, in this example, web page generator 150 also requests content 139 for web page 118. Web page generator 150 displays web page 118 with content 139 for web page 118.

As a result, the technical effect is that less processing resources are needed for web page server 108 in data processing system 122. Also web pages 114 may be displayed more quickly in client data processing systems 110 even when high traffic is present for web page server 108. The quicker display occurs because lower wait time is present for obtaining metadata 136 from web page server 108 as compared to current processes that deliver web pages.

In the illustrative example, data processing system 122 operates as a special purpose computer in which web page designer 116 in data processing system 122 enables a more efficient design of web page 118. For example, web page designer 116 reduces the knowledge and experience about web page servers needed by operator 120. Web page designer 116 also creates metadata 136 in a manner that prevents operator 120 from having to view preview 138 of web page 118 on different types of browsers to determine whether web page 118 will be displayed in a desired manner on different types of browsers. In particular, web page designer 116 transforms data processing system 122 into a special purpose computer as compared to currently available general purpose computers that do not have web page designer 116.

Data processing system 122 transforms information 106 such that information 106 has a different function or has a different use. For example, web pages 114 are stored as metadata 136 in database 107. Metadata 136 is transformed into a form for display on graphical user interface 130 in display system 126 for data processing system 122. This transformation occurs when generating preview 138 of web page 118. In other words, a visualization of web pages 114 may be generated as compared to the manner in which web pages 114 are stored in database 107.

Additionally, a similar transformation of information 106 also occurs when displaying web page 118 in graphical user interface 144 in display system 146 for client data processing system 140. Additionally, in displaying web page 118 as preview 138 in graphical user interface 130 in display system 126 for data processing system 122, or displaying web page 118 using browser 142 in graphical user interface 144 in display system 146 in client data processing system 140, content 139 may be identified and placed in web page 118 using metadata 136. These and the other transformations of information 106 in the illustrative example are more than a mere display of information 106 stored in database 107.

The illustration of information environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in addition to storing metadata 136 for web pages 114, other web pages may be present in addition to or in place of web pages 114 that are described using markup languages such as hypertext markup language (HTML), extensible markup language (XML), or some other suitable type of markup language. These types of web pages, however, may require different versions for different types of browsers in order to have a desired consistency for how the web pages are displayed on client data processing systems 110.

As another illustrative example, metadata 136 for web page 118 may be obtained from other locations other than from web page server 108. For example, metadata 136 may be located in a local cache in a client data processing system, a proxy server, a data processing system that is remote to data processing system 122, or some other location. In this example, data processing system 122 is a first data processing system and the data processing system that is remote to data processing system 122 is a second data processing system.

As another example, content 139 may be located in other locations other than database 107. For example, content 139 may be obtained from another server other than web page server 108.

In other illustrative examples, a copy of content 139 may be stored locally on client data processing system 140. In these other illustrative examples, accessing the copy of content 139 stored locally on client data processing system 140 enables web page designer 116 to create preview 138 with content 139 without accessing a server for content 139.

Figure 2:
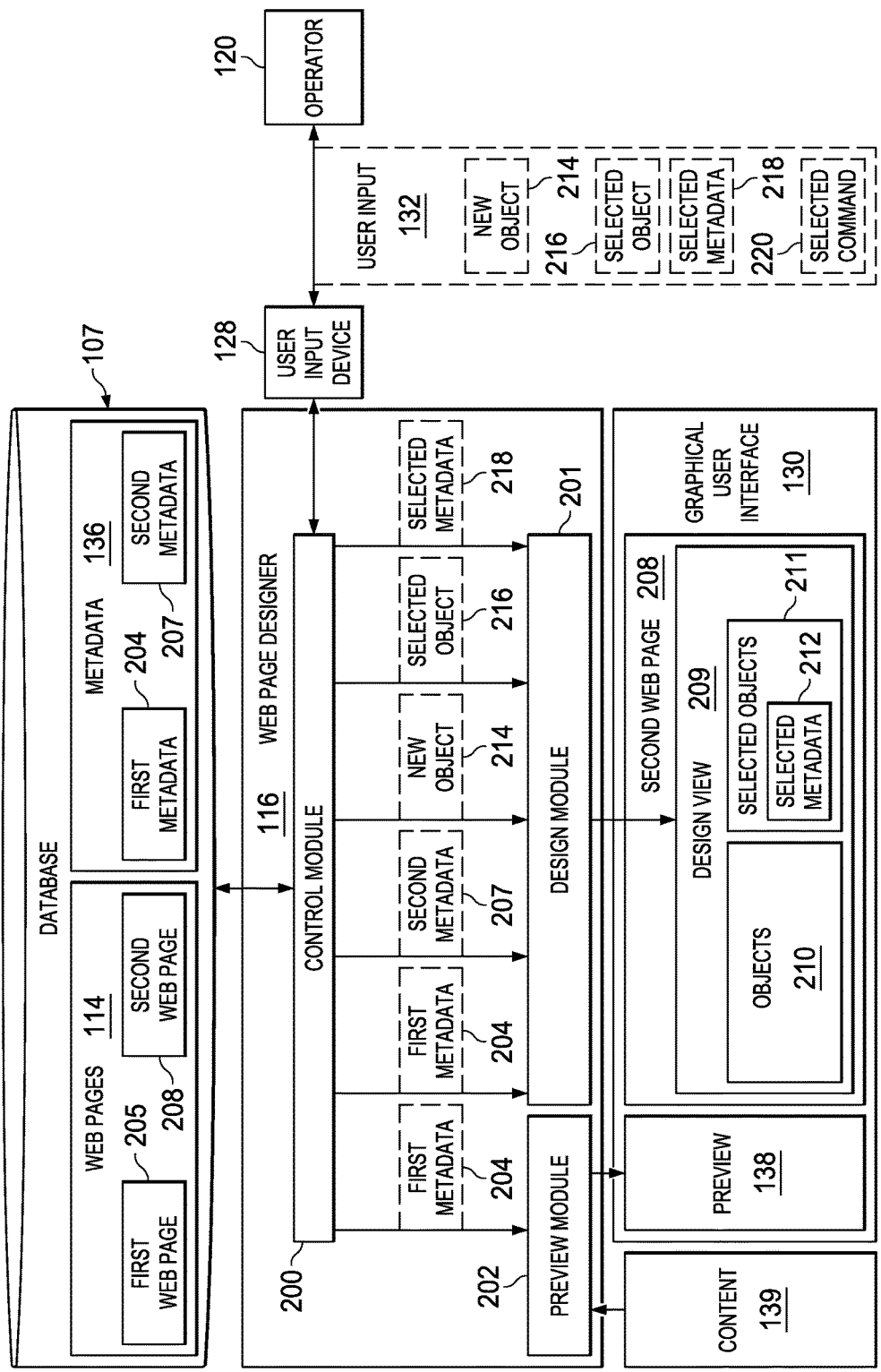
FIG. 2 is an illustration of a block diagram of data flow for designing web pages in accordance with an illustrative embodiment.

With reference next to FIG. 2, an illustration of a block diagram of data flow for designing web pages is depicted in accordance with an illustrative embodiment. In this figure, an example of data flow for a process for designing metadata 136 for web pages 114 through web page designer 116 is shown. In the illustrative examples, the same reference numeral may be used in more than one figure. This reuse of a reference numeral in different figures represents the same element in the different figures.

In this illustrative example, web page designer 116 has a number of different components. As used herein, a "number of items" means one or more items. For example, a number of different components means one or more components.

As depicted, web page designer 116 includes control module 200, design module 201, and preview module 202. Web page designer 116 uses these components to generate web pages 114. Web page designer 116 generates web pages 114 by at least one of creating new web pages or modifying existing web pages in web pages 114.

As depicted, control module 200 creates first metadata 204 for first web page 205 when operator 120 creates first web page 205 interacting with control module 200. For example, control module 200 may create first metadata 204 using objects selected by operator 120 for first web page 205. In other words, the presence of objects may be initially absent in first metadata 204 when web page designer 116 is being used to create first web page 205. First web page 205 is an example of web page 118 and first metadata 204 in metadata 136 is an example of metadata 136 for web page 118.

In this particular example, control module 200 retrieves first metadata 204 for first web page 205 from database 107 when operator 120 modifies first web page 205. Control module 200 sends first metadata 204 and second metadata 207 to design module 201. Control module 200 also sends first metadata 204 to preview module 202.

Control module 200 receives changes to first metadata 204 through user input 132 as illustrated in this figure. Control module 200 stores first metadata 204 for first web page 205 in database 107.

As depicted, design module 201 receives first metadata 204 for first web page 205 and second metadata 207 for second web page 208 from control module 200. Design module 201 creates design view 209 from second metadata 207 for second web page 208. In this illustrative example, design view 209 is displayed in graphical user interface 130. Design view 209 is an interface displayed by design module 201 to operator 120. In this illustrative example, design view 209 is used by operator 120 to visually design web pages 114. The designing of web pages 114 may include creating new web pages in web pages 114, modifying existing web pages in web pages 114, or some combination thereof.

In displaying design view 209, design module 201 in web page designer 116 displays objects 210 and selected objects 211 in second web page 208. Second web page 208 is generated by design module 201 from second metadata 207. Second metadata 207 may be stored and retrieved from database 107 in this example.

Thus, database 107 may include metadata 136 for web pages 114 that are accessed by client data processing system 140. Additionally, database 107 also may include second metadata 207 for second web page 208 for design view 209 used by operator 120 at data processing system 122. In other illustrative examples, second metadata 207 may be stored in other locations, such as in data processing system 122.

As depicted, second web page 208 forms design view 209 in graphical user interface 130. Operator 120 interacts with design view 209 to design first web page 205. In other words, design view 209 may be a web page similar to web page 118 and web pages 114 that are designed by operator 120.

In this illustrative example, the process includes generating metadata 136 for web pages 114. For example, first web page 205 may be modified by modifying first metadata 204 for first web page 205 through operator 120 interacting with second web page 208. As depicted, design module 201 creates design view 209 to receive user input 132 for generating first metadata 204 for first web page 205.

As shown in this figure, design view 209 includes objects 210 and a group of selected objects 211. Objects 210 are examples of objects 134 in FIG. 1. In the illustrative example, one or more of objects 210 may be added to the group of selected objects 211 through user input 132.

As depicted, design module 201 identifies the group of selected objects 211 from first metadata 204. Design module 201 also identifies selected metadata 212 for the group of selected objects 211 from first metadata 204. Selected metadata 212 is first metadata 204 for first web page 205. Design module 201 displays the group of selected objects 211 in design view 209 based on selected metadata 212.

In this illustrative example, control module 200 receives user input 132 at design view 209 displayed in graphical user interface 130 through input device 128. Design module 201 receives new object 214 from user input 132 through control module 200. New object 214 is an object that is used to create an object for first web page 205. For example, new object 214 may be a button that operator 120 adds to first web page 205.

Operator 120 may identify new object 214 through user input 132 that selects new object 214 in objects 210. For example, user input 132 may be a drag and drop operation of new object 214 from objects 210 to the group of selected objects 211.

As depicted, design module 201 receives selected object 216 from user input 132 through control module 200. Selected object 216 is an object selected from the group of selected objects 211. Design module 201 displays selected metadata 212 for selected object 216 when selected object 216 is received.

Design module 201 receives selected metadata 218 from user input 132 through control module 200. Selected metadata 218 is at least one of user input that creates selected metadata 212 for selected objects 211 or user input that changes selected metadata 212 for selected objects 211.

In this illustrative example, control module 200 modifies first metadata 204 based on changes to the group of selected objects 211 and selected metadata 212. For example, when new object 214 is added to the group of selected objects 211 in design view 209, control module 200 also adds new object 214 to first metadata 204.

Control module 200 receives selected command 220 through input device 128. Selected command 220 is a command to perform at least one of retrieving first metadata 204, storing first metadata 204, generating preview 138 based on first metadata 204, generating design view 209 based on first metadata 204, or some other suitable action.

In this illustrative example, control module 200 retrieves first metadata 204 for first web page 205 from database 107, when the command to retrieve first metadata 204 is received. Control module 200 also sends first metadata 204 to design module 201 and preview module 202 when the command to retrieve first metadata 204 is received. As depicted, control module 200 stores first metadata 204 in database 107 when the command to store first metadata 204 is received.

The illustration of data flow for designing web page 118 shown in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, instead of displaying design view 209 in second web page 208, design module 201 may display design view 209 in any suitable type of window in graphical user interface 130. In this example, design module 201 may create the window in graphical user interface 130 for which design module 201 displays design view 209.

As another example, design module 201 may create second web page 208 in a window for a browser. In this example, the browser displays the window in graphical user interface 130.

Figure 3:
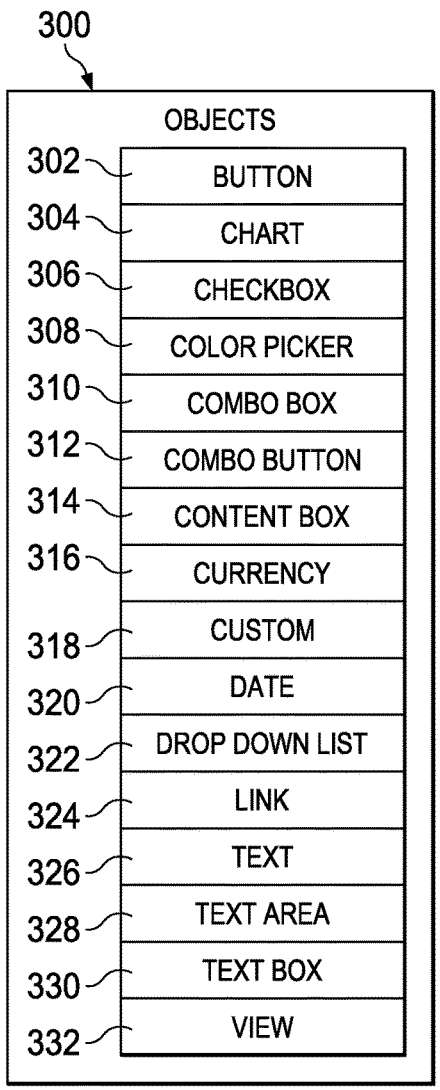
FIG. 3 is an illustration of a block diagram of objects in accordance with an illustrative embodiment.

With reference now to FIG. 3, an illustration of a block diagram of objects is depicted in accordance with an illustrative embodiment. In this illustrative example, objects 300 are examples of objects 134 in FIG. 1 and objects 210 in FIG. 2. Objects may be selected for a web page from objects 300 in this example.

As depicted, objects 300 include button 302, chart 304, check box 306, color picker 308, combo box 310, combo button 312, content box 314, currency 316, custom 318, date 320, drop down list 322, link 324, text 326, text area 328, text box 330, and view 332.

In this illustrative example, view 332 is an object that includes a group of objects with a layout. A layout for a group of objects is a description of how the group of objects are arranged relative to each other on a graphical user interface when the group of objects are displayed. For example, view 332 may be included in metadata for a web page for storing information for the group of objects included in view 332 and information for the layout of the group of objects. This information is placed into the metadata for the web page.

In these illustrative examples, a portion of the objects in the group of objects included in view 332 may also be views. These views, in turn include other groups of objects. These views are used to form a hierarchy for the objects for the web page. As depicted, the hierarchy represents parent to child relationships for the objects. In other words, view 332 is an object that is the parent of a group of objects. The group of objects included in view 332 are children of view 332.

Button 302 is an object in a web page that displays text. Button 302 is selectable. Selecting button 302 performs an action for the web page. This action is at least one of retrieving dynamic content for the web page, saving data entered into the web page, displaying another web page, or any other suitable type of action for a button on a web page. Chart 304 is a table that displays rows and columns of other objects in objects 300.

Currency 316 is an entry field for entering a monetary amount. The display of currency 316 is based on a format for currency for a selected locale. For example, if the selected locale is United States English, the monetary amount in currency 316 may be displayed in the format $xxx,xxx.xx. Custom 318 is an entry field with a custom format.

Objects 300 may also include at least one of additional types of objects, or different types of objects. For example, color picker 308 may not be included in objects 300. As another example, objects 300 may include a slider bar for selecting from a group of options with the slider bar.

Figure 4:
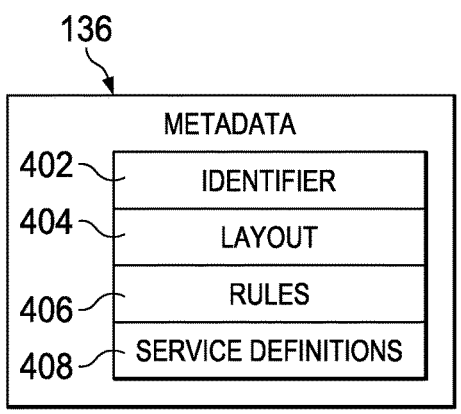
FIG. 4 is an illustration of a block diagram of metadata in accordance with an illustrative embodiment.

Turning to FIG. 4, an illustration of a block diagram of metadata is depicted in accordance with an illustrative embodiment. In this illustration, an example of a number of components of metadata 136 for web page 118 is shown.

As depicted, metadata 136 includes identifier 402, layout 404, rules 406, and service definitions 408. Identifier 402 points to web page 118. For example, identifier 402 may be a universal resource locator for web page 118. Layout 404 in metadata 136 is a layout for objects displayed on web page 118.

Rules 406 are included in metadata 136. In this illustrative example, rules 406 are at least one of code that performs actions for objects in layout 404, or options used by code to perform actions for objects in layout 404. For example, if the layout for web page 118 includes a button, a rule in rules 406 for the button may be to execute code that performs an action for the button when a user input selects the button.

In this illustrative example, when a rule in rules 406 for an object in objects 300 in layout 404 is located in metadata 136, the rule is an embedded rule for the object. In other words, the rule in rules 406 is embedded in metadata 136 for the object for web page 118 when the rule is included in metadata 136 for the object for web page 118.

Service definitions 408, is configuration information for sending and receiving user data and content 139. User data is data in objects entered by an operator. For example, if the layout for web page 118 includes a text box for entering in text, the text entered by the operator is user data.

The configuration information in service definitions 408 includes at least one of json service definition configuration information, or other suitable types of service definition configuration information. For example, service definitions 408 may include information for using json objects through restful application programming interfaces to send and receive user data and content 139.

Figure 5:
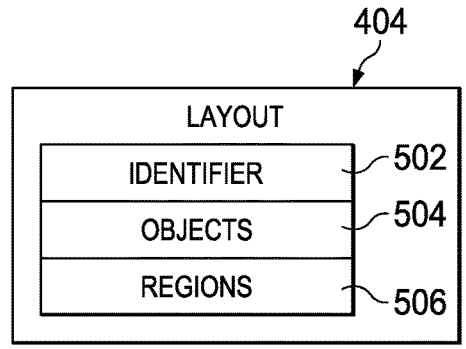
FIG. 5 is an illustration of a block diagram of a layout in accordance with an illustrative embodiment.

Turning next to FIG. 5, an illustration of a block diagram of a layout is depicted in accordance with an illustrative embodiment. In this illustration, an example of a number of components of layout 404 in metadata 136 for web page 118 is shown.

In this illustrative example, layout 404 includes identifier 502, objects 504, and regions 506. Identifier 502 is alphanumeric characters for layout 404 used to identify layout 404 in web page 118. Objects 504 are a group of objects selected from objects 300.

Regions 506 are portions of web page 118 where objects 504 are located. Regions 506 include information describing locations of objects 504 relative to each other in these portions of web page 118 when web page 118 is displayed.

Figure 6:
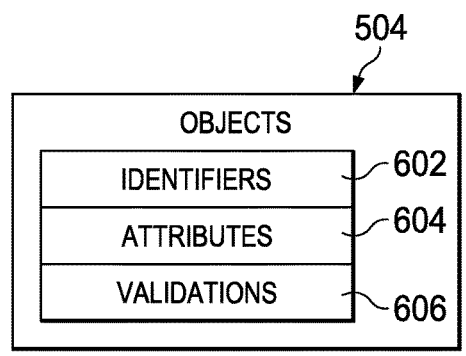
FIG. 6 is an illustration of a block diagram of objects in accordance with an illustrative embodiment.

Turning now to FIG. 6, an illustration of a block diagram of objects is depicted in accordance with an illustrative embodiment. In this illustration, an example of a number of components of objects 504 in layout 404 in metadata 136 for web page 118 is shown.

As depicted in this example, objects 504 includes identifiers 602, attributes 604, and validations 606. Identifiers 602 are names for objects 504. These names may be used to identify one object from another in objects 504.

Attributes 604 are values for objects 504 that define objects 504. Attributes 604 include at least one of display characteristics, content, default selections, or other suitable types of attributes for objects 504.

In this illustrative example, validations 606 are at least one of code that validates objects 504, or options used by code to validate objects 504. For example, when the object is a date, the validation code may verify that the date entered by an operator is valid.

Figure 7:
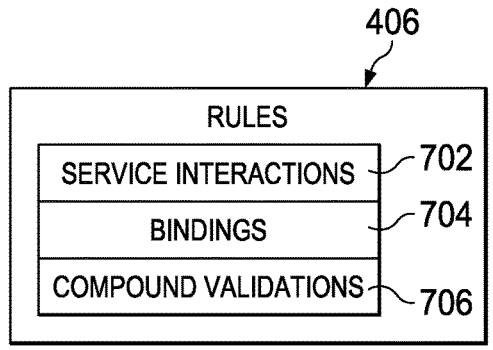
FIG. 7 is an illustration of a block diagram of rules in accordance with an illustrative embodiment.

With reference to FIG. 7, an illustration of a block diagram of rules is depicted in accordance with an illustrative embodiment. In this illustration, an example of a number of components of rules 406 in metadata 136 for web page 118 is shown.

In this illustrative example, rules 406 include service interactions 702, bindings 704, and compound validations 706. Service interactions 702 is code that performs actions based user input provided to objects 504 specified in layout 404 in metadata 136 for web page 118.

For example, service interactions 702 for objects 504 may include program code for generating an order form based on user input made to objects 504. In this example, the program code for generating the order form in service interactions 702 is executed when user input made to objects 504 on web page 118 is received. For example, the order form may be a json object that is generated by service interactions 702.

As another example, service interactions 702 for objects 504 may include program code for calculating a value for an object in objects 504 based on user input provided to objects 504. In this example, the program code for calculating the value in service interactions 702 is executed when user input to objects 504 on web page 118 is received. For example, the value may be the output of an algorithm implemented by service interactions 702 for web page 118 that processes user input made to objects 504.

In this illustrative example, the program code for calculating the value may be a java script function. The following is an example of program code in service interactions 702 that calculates tax for an object in objects 504:

```
function calculateTax(salesPrice, taxRate) {
    return salesPrice * taxRate;
}
document[objectName].value =
    calculateTax(document[salesPriceInput].value,
        document[taxRateInput].value);
``` where "document" is a data structure that includes objects 504, "salesPrice" and "taxRate" are parameters of the function "calculateTax", "salesPriceInput" and "taxRateInput" are examples of objects in objects 504 in which user input is present, and "objectName" is an example of the object where the value calculated by the function "calculateTax" is placed on web page 118.

In this illustrative example, the function "calculateTax" is executed on at least one of client data processing systems 110, data processing system 122, or web page server 108. When data used by a function in service interactions 702 is not provided to the function as a parameter of the function, the execution of the function may be restricted to a data processing system that has access to the data. For example, when a function in service interactions 702 accesses the data structure "document," execution of the function may be restricted to the data processing system where "document" is present.

Bindings 704 is code that links user input and content in objects 504 to an application programming interface for sending and retrieving the user input and content. For example, a binding in bindings 704 for a text box in web page 118 may include code that sends the text entered into the text box as a json object using a restful application programming interface.

Compound validations 706 are codes that validate a group of objects 504. For example, when web page 118 includes a group of name and address text boxes, a compound validation for the group of name and address text boxes may include code that validates the name and address entered.

Figure 8:
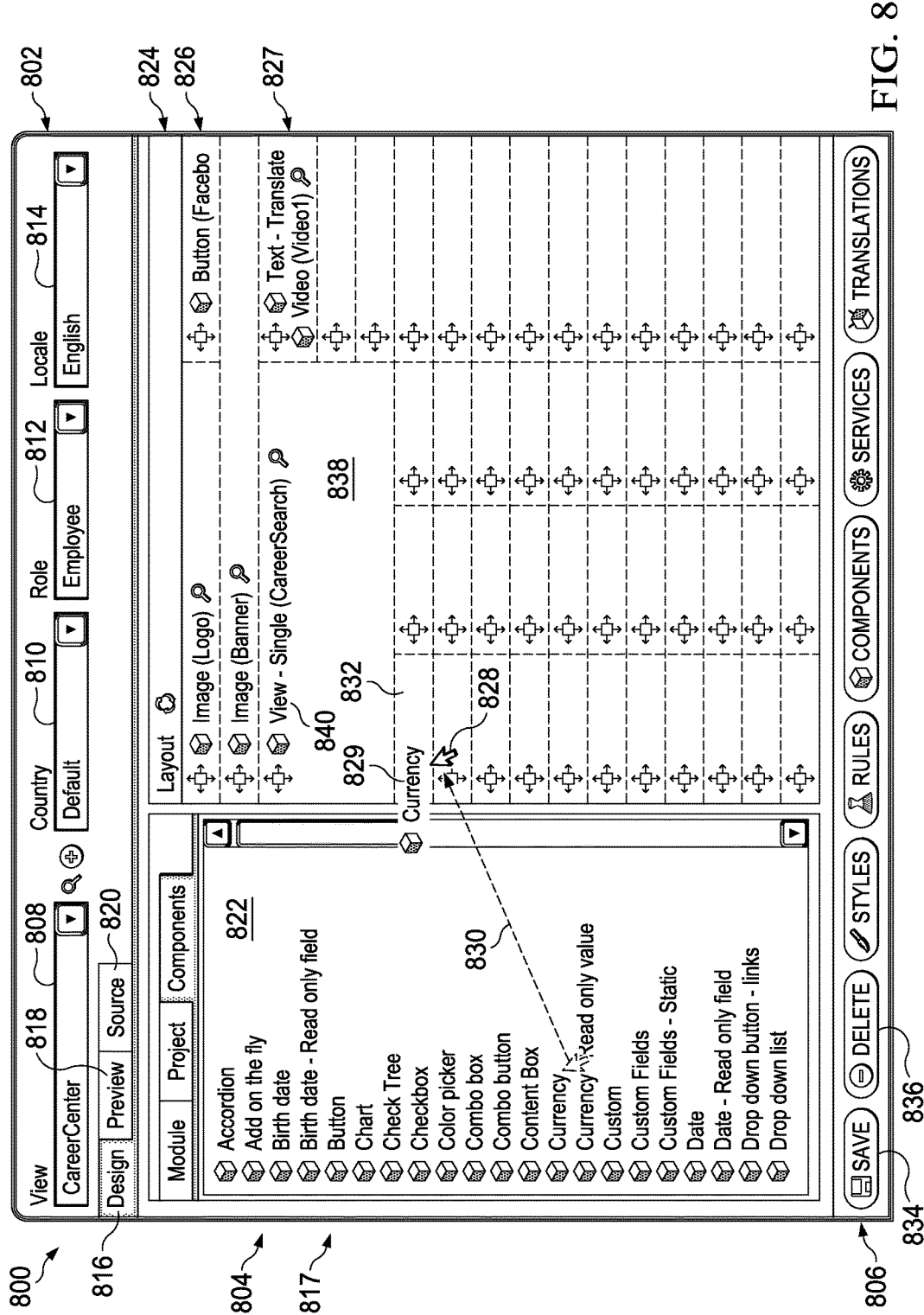
FIG. 8 is an illustration of a graphical user interface for designing a web page in accordance with an illustrative embodiment.

FIGS. 8-12 are diagrams of illustrative examples of a graphical user interface that may be used to design a web page. With reference first to FIG. 8, an illustration of a graphical user interface for designing a web page is depicted in accordance with an illustrative embodiment. As depicted, graphical user interface 800 is an example of one implementation for graphical user interface 130 shown in block form in FIG. 1.

In this illustrative example, graphical user interface 800 includes a number of different graphical elements in a number of different sections. As depicted, graphical user interface 800 includes options section 802, views section 804, and commands section 806.

Options section 802 includes drop down list 808 for selecting a web page from drop down list 808 as the web page being designed in graphical user interface 800. The web page being designed in graphical user interface 800 is an example of web page 118 shown in block form in FIG. 1.

Options section 802 also includes drop down list 810 for selecting the country being used for a group of language translations in graphical user interface 800. In this illustrative example, when the country selected in drop down list 810 is set to default, the country used is set to at least one of the country where data processing system 122 is located, the country where client data processing system 140 is located, or a preference selected by operator 120.

Options section 802 further includes, drop down list 812 for selecting the role of operator 120 in using graphical user interface 800 to generate web page 118. As depicted, the role of operator 120 is selected from at least one of architect for generating web page 118, coder for generating rules in metadata for web page 118, translator for generating translations, or other suitable types of roles of operators that use graphical user interface 800.

In the illustrative example, the role selected specifies which changes to metadata for web page 118 are allowed by operator 120. For example, operator 120 may be allowed to create or modify translations and may not be allowed to make other types of changes when the role selected is translator.

In this illustrative example, drop down list 814 in options section 802 is for selecting the locale being used in graphical user interface 800. In this illustrative example, when the locale selected in drop down list 814 is set to default, the locale used is set to at least one of the default locale for the country where data processing system 122 is located, the locale for the country where client data processing system 140 is located, or a preference selected by operator 120.

As depicted, options section 802 still further includes tab 816 for selecting design view 817 to show design view 817 in views section 804, tab 818 for selecting a preview to show the preview in views section 804, and tab 820 for selecting a source view to show the source view in views section 804. In this illustrative example, tab 816 has been selected.

Design view 817 shown in graphical user interface 800 is an example of design view 209 shown in block form in FIG. 1. Design view 817 includes objects 822 and layout 824. As depicted, objects 822 shown in design view 817 are an example of objects 210 shown in block form in FIG. 2. In this particular example, layout 824 is an example of layout 404 shown in block form in FIG. 4 for metadata 136 shown in block form in FIG. 4 for web page 118.

As depicted, regions 826 in layout 824 show portions of web page 118 where objects 827 are located. Regions 826 show relative locations within layout 824 where objects 827 are shown when web page 118 is displayed. Regions 826 shown in layout 824 are examples of regions 506 shown in block form in FIG. 5. Objects 827 are examples of objects 504 shown in block form in FIG. 5 and selected objects 211 shown in block form in FIG. 2.

In this illustrative example, operator 120 has used pointer 828 to perform a drag and drop operation to create new object 829. As depicted, operator 120 has moved new object 829 in the direction of arrow 830 to region 832. New object 829 is an example of new object 214 shown in block form in FIG. 2. New object 829 is an example of currency 316 shown in block form in FIG. 3. Pointer 828 shown in graphical user interface 800 is an example of input device 128 shown in block form in FIG. 1.

Commands section 806 includes a number of different buttons. In this illustrative example, commands section 806 includes save button 834 and delete button 836. Selecting these buttons sends commands to web page designer 116.

For example, web page designer 116 receives and processes the command to save web page 118 when save button 834 is selected. As another example, web page designer 116 receives and processes the command to delete a selected object in objects 827 when delete button 836 is selected.

As depicted, region 838 is located in regions 826. Region 838 includes object 840. Object 840 is an example of view 332 shown in block form in FIG. 3. In this illustrative example, object 840 is an example of a view in web page 118 for performing a search for jobs related to a type of career.

Figure 9:
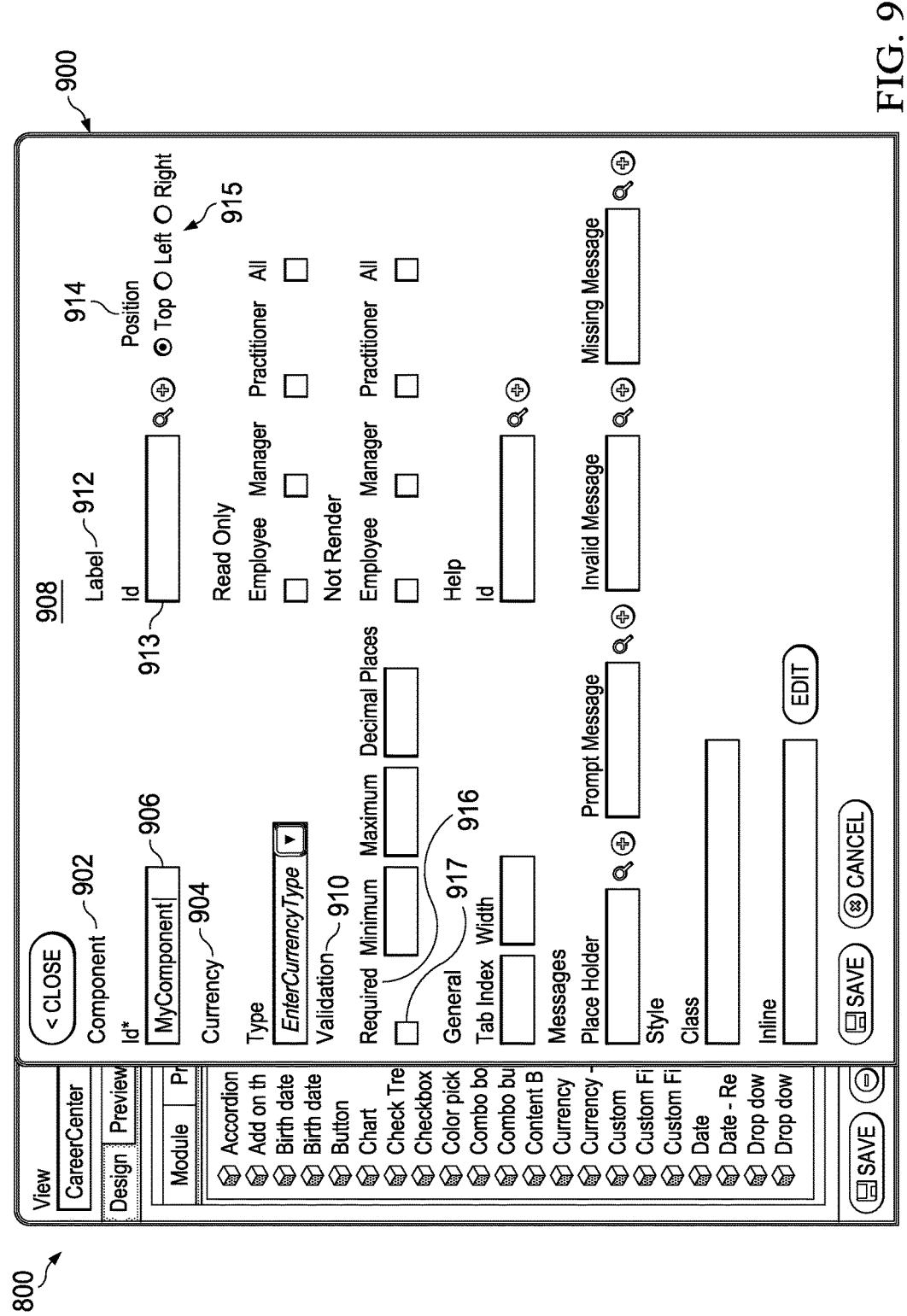
FIG. 9 is an illustration of a graphical user interface for designing a web page in accordance with an illustrative embodiment.

With reference next to FIG. 9, an illustration of a graphical user interface for designing a web page is depicted in accordance with an illustrative embodiment. In this illustration, graphical user interface 800 is showing a number of graphical elements used to generate metadata 900 for selected object 902 for web page 118. Selected object 902 is an example of selected object 216 shown in block form in FIG. 2.

Metadata 900 is a portion of metadata 136 for selected object 902. This portion includes a number of graphical elements. In this illustrative example, metadata 900 includes label 904, identifier 906, a group of attributes 908, and a group of validations 910.

Label 904 is text that identifies selected object 902 as a currency object. Identifier 906 shows that the name of the selected object is "MyComponent." Identifier 906 is an example of an identifier in identifiers 602 shown in block form in FIG. 6.

In this illustrative example, the group of attributes 908 shown in graphical user interface 800 is an example of a portion of attributes 604 for selected object 902 shown in block form in FIG. 6. The group of validations 910 shown in graphical user interface 800 is an example of a portion of validations 606 for selected object 902 shown in block form in FIG. 6.

As depicted, label 912 in the group of attributes 908 is text that describes selected object 902. The text for label 912 is entered into text entry field 913 for label 912.

Position 914 in the group of attributes 908 specifies where label 912 is displayed relative to selected object 902. Position 914 is selected using radio button 915 for position 914. In the illustrative example, the selection for where to display label 912 relative to selected object 902 is between at least one of on top of selected object 902, to the left of selected object 902, or to the right of selected object 902.

Attributes 908 are entered by an operator through user input. For example, an operator may enter the text for label 912 into text entry field 913 and make the selection for where to display label 912 relative to selected object 902 using radio button 915 for position 914.

In this illustrative example, the group of validations 910 specifies the validations for selected object 902. As depicted, required 916 in group of validations 910 specifies whether selected object 902 is required or not required. When selected object 902 is required, an amount of currency must be entered into selected object 902. Whether selected object 902 is required or not required is entered into check box 917 for required 916.

Figure 10:
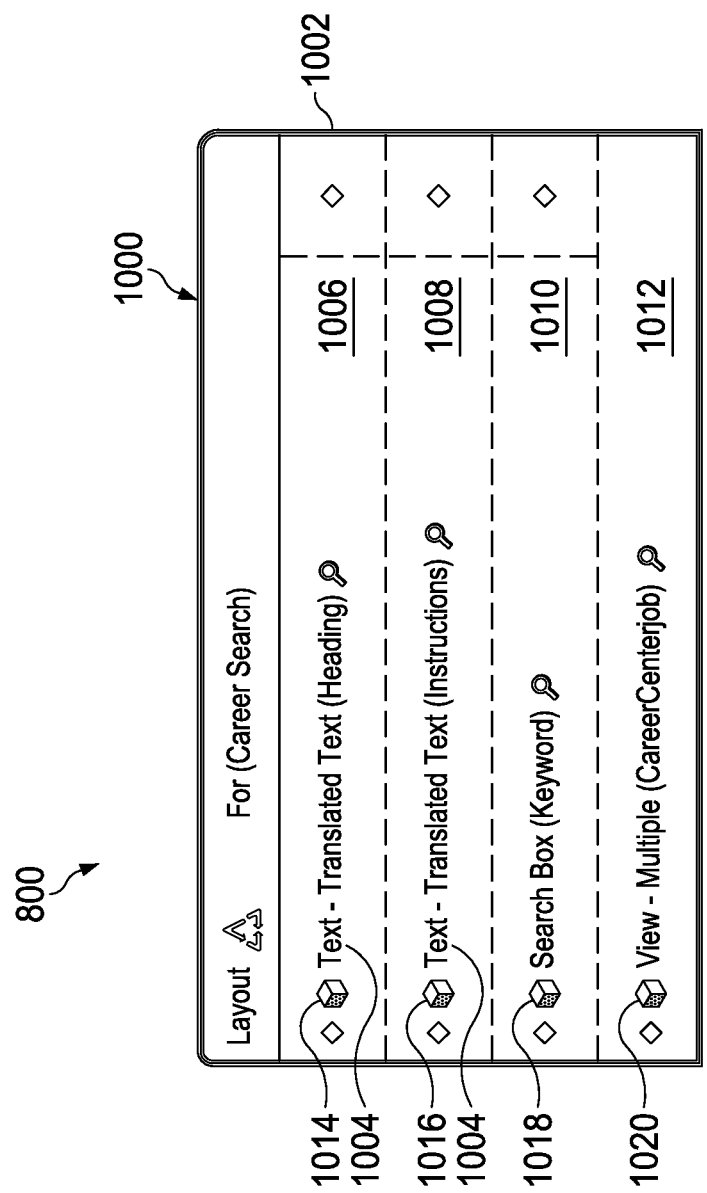
FIG. 10 is an illustration of a graphical user interface for designing a view in a web page in accordance with an illustrative embodiment.

With reference next to FIG. 10, an illustration of a graphical user interface for designing a view in a web page is depicted in accordance with an illustrative embodiment. In this illustration, object 838 in region 840 has been selected. As discussed above in the description of FIG. 8, object 838 is an example of view 332 shown in block form in FIG. 3.

In this figure, graphical user interface 800 is showing layout 1000 for object 838. Layout 1024 is displayed when object 838 in region 840 is selected. Layout 1024 is used to generate metadata 1000 for object 838. Layout 1000 is an example of layout 404 shown in block form in FIG. 4 for metadata 136 for object 838.

As depicted, regions 1002 in layout 1000 show portions of object 838 where objects 1004 are located. Regions 1002 show relative locations within layout 1000 where objects 1004 are shown when object 838 in web page 118 is displayed.

Regions 1002 include region 1006, region 1008, region 1010, and region 1012. These regions are examples of regions 506 shown in block form in FIG. 5.

Objects 1004 include object 1014, object 1016, object 1018, and object 1020. Object 1014 is located in region 1006, object 1016 is located in region 1008, object 1018 is located in region 1010, and object 1020 is located in region 1012. These objects are examples of objects 504 shown in block form in FIG. 5. Object 1014 and 1016 are examples of text 326 shown in block form in FIG. 3; object 1018 is an example of text box 330 shown in block form in FIG. 3; and object 1020 is an example of view 332 shown in block form in FIG. 3.

As depicted, object 1020 is for multiple views. In this illustrative example, the multiple views are for career center jobs. For example, when object 1020 is displayed in web page 118 object 1020 may show multiple career center jobs based on text entered into object 1018.

In this illustrative example, metadata 136 for object 1020 includes metadata 136 for objects 1004. Metadata 136 for object 1020 includes metadata 136 for objects in a layout for object 1020. As depicted, metadata 136 for object 1020 is combined with metadata 136 for other objects in objects 1004 to form metadata 136 for object 838. Similarly, metadata 136 for object 838 is combined with metadata 136 for other objects in objects 827 to form metadata 136 for web page 118.

As depicted, when an object in a first layout is an example of view 332, the object includes a second layout with objects that form the object. Each of the objects that form the object may in turn also be an example of view 332. In other words, when an object in web page 118 is an example of view 332, metadata 136 for web page 118 is hierarchical.

Figure 11:
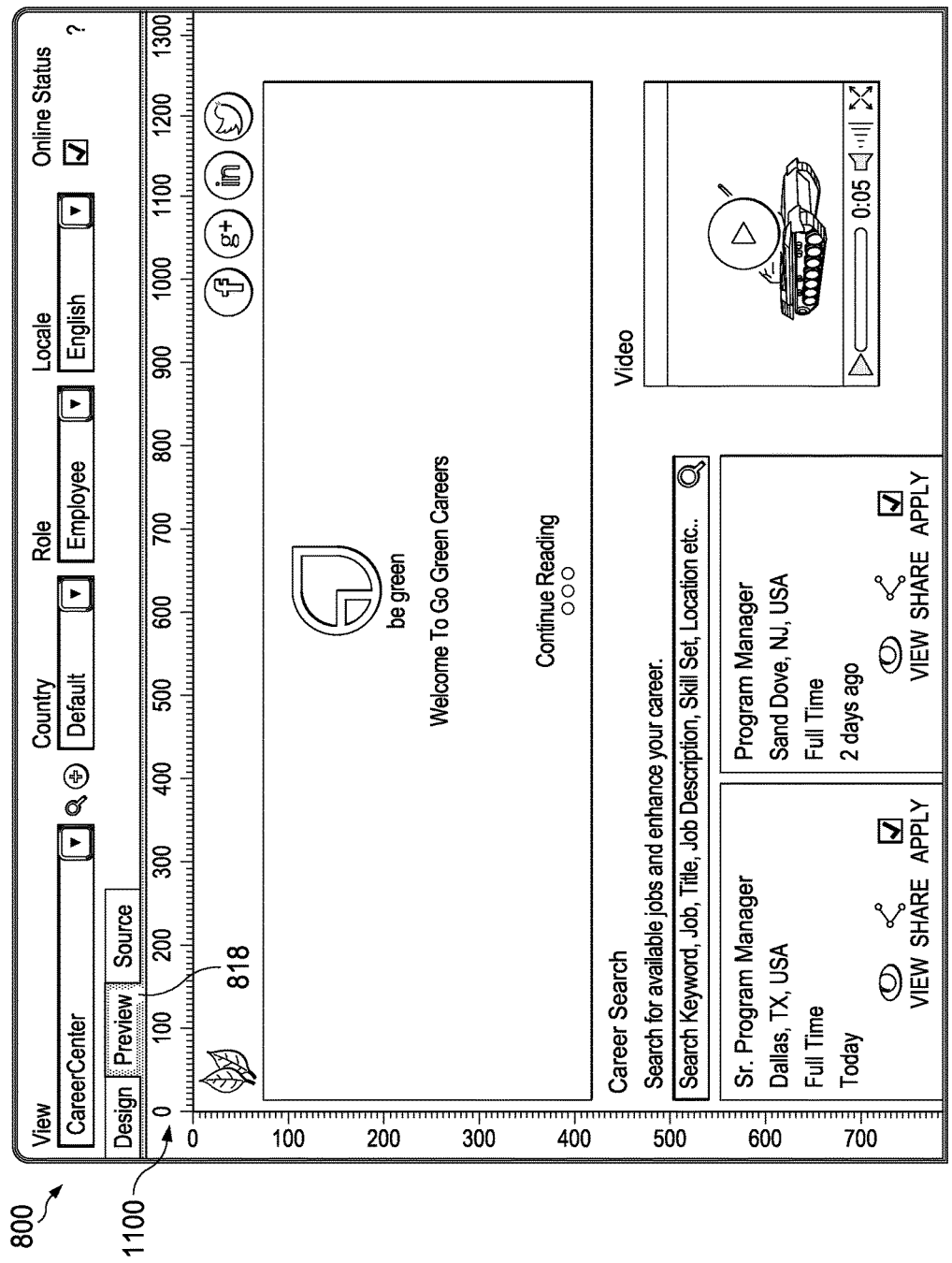
FIG. 11 is an illustration of a graphical user interface for displaying a preview of a web page in accordance with an illustrative embodiment.

With reference now to FIG. 11, an illustration of a graphical user interface for displaying a preview of a web page is depicted in accordance with an illustrative embodiment. In this illustration, tab 818 has been selected.

As depicted, graphical user interface 800 is showing preview 1100 for web page 118. Preview 1100 is an example of preview 138 shown in block form in FIGS. 1-2.

In FIG. 12, an illustration of a graphical user interface for displaying a source view of a web page is depicted in accordance with an illustrative embodiment. In this illustration, tab 820 has been selected.

As depicted, graphical user interface 800 is showing source view 1200 for web page 118. In this illustrative example, source view 1200 includes metadata 1202. Metadata 1202 is an example of metadata 136 shown in block form in FIGS. 1-2. Graphical user interface 800 displays metadata 1202 as text in this illustrative example.

Figure 13:
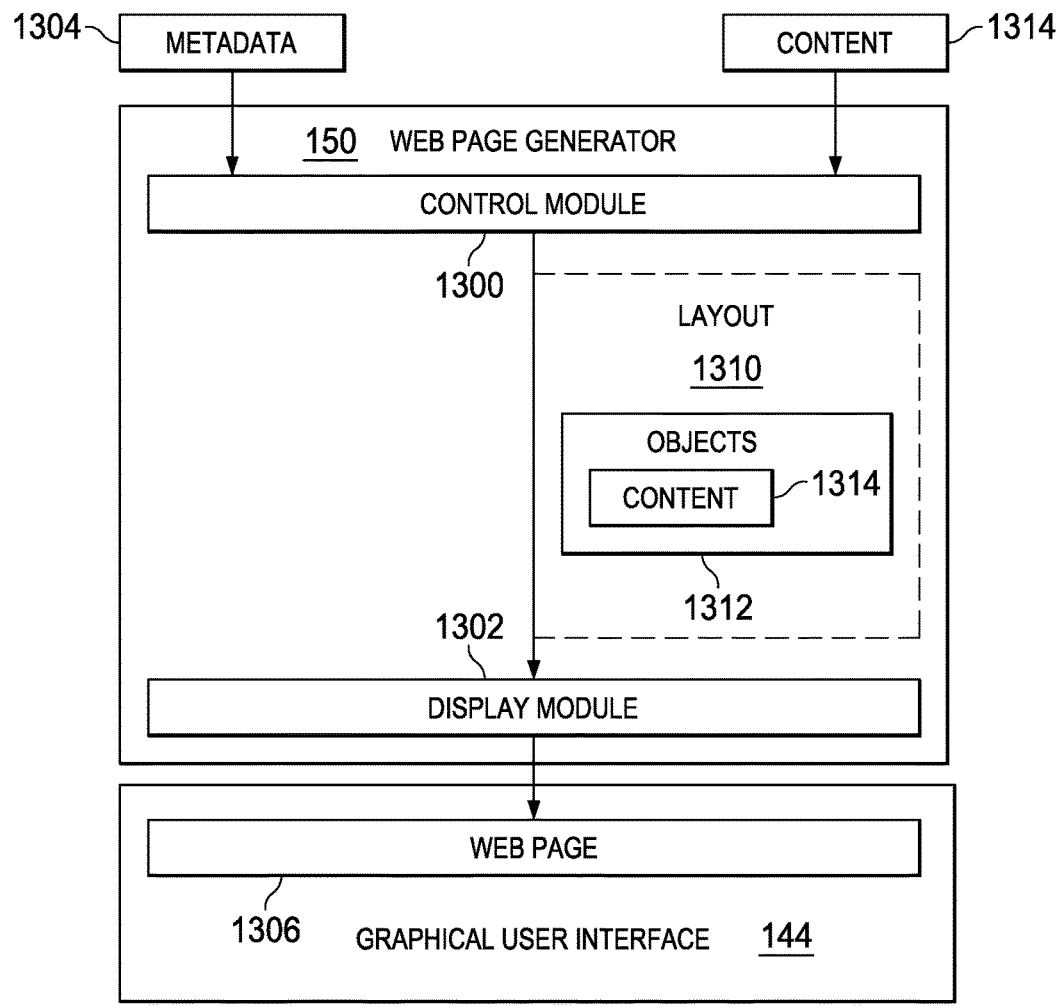
FIG. 13 is an illustration of a block diagram of data flow for displaying web pages in accordance with an illustrative embodiment.

With reference now to FIG. 13, an illustration of a block diagram of data flow for displaying web pages is depicted in accordance with an illustrative embodiment. In this depicted example, the data flow may be implemented in client data processing system 140 to display web pages 114. In this example, web pages 114 have been designed using web page designer 116 in data processing system 122.

In this figure, an example of data flow for a process that generates and displays a web page in web pages 114 through web page generator 150 is shown. In this illustration, web page generator 150 is a program. For example, web page generator 150 may be implemented as a browser.

In this illustrative example, web page generator 150 includes control module 1300 and display module 1302. Control module 1300 receives metadata 1304 describing web page 1306. Metadata 1304 for web page 1306 is an example of metadata for a web page in metadata 136. Web page 1306 is an example of a web page in web pages 114 in FIG. 1.

Control module 1300 identifies layout 1310 for web page 1306 from metadata 1304. Layout 1310 specifies the layout of objects 1312 in web page 1306. Control module 1300 identifies objects 1312 from metadata 1304. Layout 1310 is an example of layout 404 in FIG. 5. Objects 1312 are examples of objects 504 in FIG. 6.

Control module 1300 identifies content 1314 needed for web page 1306 based on metadata 1304. Control module 1300 obtains content 1314 for web page 1306. For example, control module 1300 may obtain content 1314 from at least one of database 107 in FIG. 1 or some other suitable location where content 1314 is stored.

Control module 1300 places content 1314 into objects 1312 based on metadata 1304. For example, when an attribute in metadata for an object points to content, control module 1300 places the content into the object.

As depicted, display module 1302 receives layout 1310 from control module 1300. Display module 1302 creates web page 1306 using layout 1310. For example, layout 1310 may specify that web page 1306 is displayed as preview 1100 shown in FIG. 11 with objects for a web page used for performing a career search. Display module 1302 displays web page 1306 on graphical user interface 144.

Figure 14:
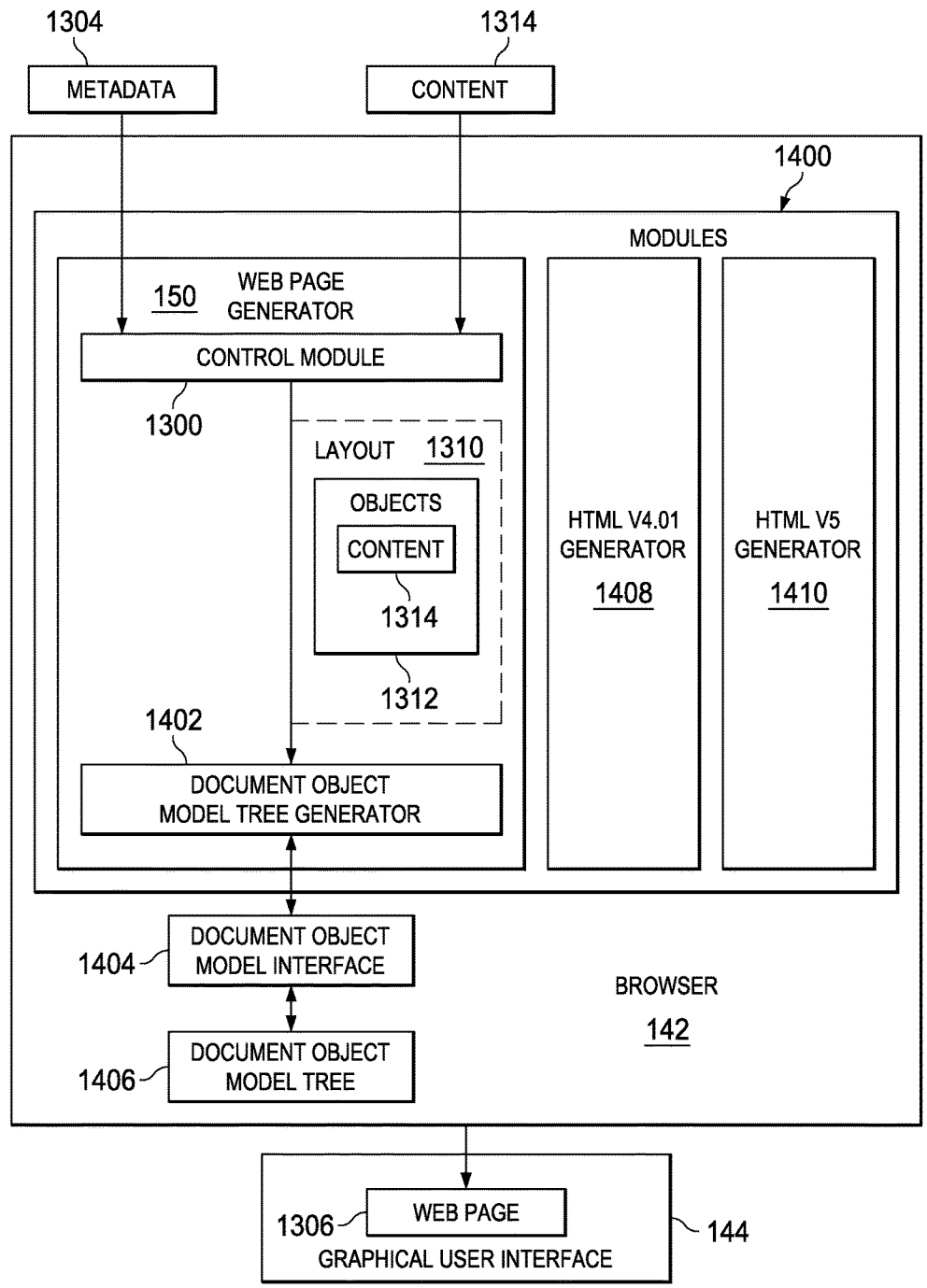
FIG. 14 is an illustration of another block diagram of data flow for displaying web pages in accordance with an illustrative embodiment.

With reference now to FIG. 14, an illustration of another block diagram of data flow for displaying web pages is depicted in accordance with an illustrative embodiment. In this illustration, the data flow may be implemented in browser 142 in client data processing system 140 to display web pages 114. Web pages 114 have been designed using web page designer 116 in data processing system 122 in this illustrative example.

In this figure, an example of data flow for a process that generates and displays a web page in web pages 114 through web page generator 150 is shown. In this illustration, web page generator 150 is a module in modules 1400 in browser 142.

In this illustrative example, web page generator 150 includes control module 1300 and document object model tree generator 1402. As described above in FIG. 13, control module 1300 identifies layout 1310 for objects 1312 from metadata 1304, obtains content 1314 for web page 1306, and places content 1314 in objects 1312.

As depicted, browser 142 includes document object model interface 1404. Document object model interface 1404 is an application programming interface in browser 142 for generating and accessing document object model trees. A document object model tree is a data structure that includes objects. These objects are examples of objects 134 in FIG. 1.

Document object model tree generator 1402 receives layout 1310 from control module 1300. Document object model tree generator 1402 uses document object model interface 1404 to generate document object model tree 1406 for web page 1306 from layout 1310.

Browser 142 generates web page 1306 from document object model tree 1406. In this illustrative example, browser 142 displays web page 1306.

In this illustrative example, modules 1400 include web page generator 150, hypertext markup language (HTML) version (v.) 4.01 generator 1408, and hypertext markup language version 5 generator 1410. As depicted, modules 1400 in browser 142 enable browser 142 to generate and display web pages based on metadata 1304, hypertext markup language version 4.01, and hypertext markup language version 5.

Web pages other than web pages 114 may be designed using different versions of hypertext markup language. Different web browsers implement support for these different versions of hypertext markup language. These web browsers have unique implementations for the versions of hypertext markup language. As a result, there are differences between the web browsers in how these other web pages look when displayed by the different web browsers.

Web pages 114 are designed using web page designer 116. Metadata 136 specifies what web pages 114 look like when displayed. Web pages 114 are generated and displayed by the web browsers using web page generator 150. Thus, no differences are present for what web pages 114 look like between the different web browsers when web pages 114 are displayed by the different web browsers.

The illustration of data flow for displaying web pages shown in FIGS. 13-14 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, web page generator 150 may also store user data entered into web page 1306. In this example, when metadata 1304 includes a rule for storing the user data, web page generator 150 stores the user data based on the metadata for the rule.

As another example, metadata 1304 may be a first version of metadata 1304 received by web page generator 150. In this example, web page generator 150 may receive a second version of metadata 1304. Web page generator 150 may then generate web page 1306 a second time using the second version of metadata 1304 and content 1314. Web page generator 150 may display the web page generated the second time in graphical user interface 144.

As yet another example, control module 1300 may store metadata 1304 in a cache in client data processing system 140 when metadata 1304 is received. In this example, control module 1300 may also retrieve metadata 1304 from the cache in the client data processing system 140.

As a further example, control module 1300 may receive other metadata for an application instead of metadata 1304. In this example, the metadata for the application specifies web pages of the application. Control module 1300 identifies metadata 1304 from a portion of the metadata for a web page specified in the metadata for the application. In other words, the processes shown in FIG. 13 and FIG. 14 for displaying web page 1306 can also be used to create and display web pages of applications.

As still another example, the example of web page generator 150 in FIG. 14 as a module in modules 1400 in browser 142 may also be implemented as at least one of a plug-in for browser 142, an extension for browser 142, as part of browser 142, or in some other suitable manner.

An illustrative example may be used to create a web page for display on a browser that takes into account policies for a country or some other type of political unit. In particular, the web page may be created to perform an operation with respect to a country. This type of web page creation is in contrast to creating a web page based on a locale where the operator performing the operation with respect to a country is located.

Figure 15:
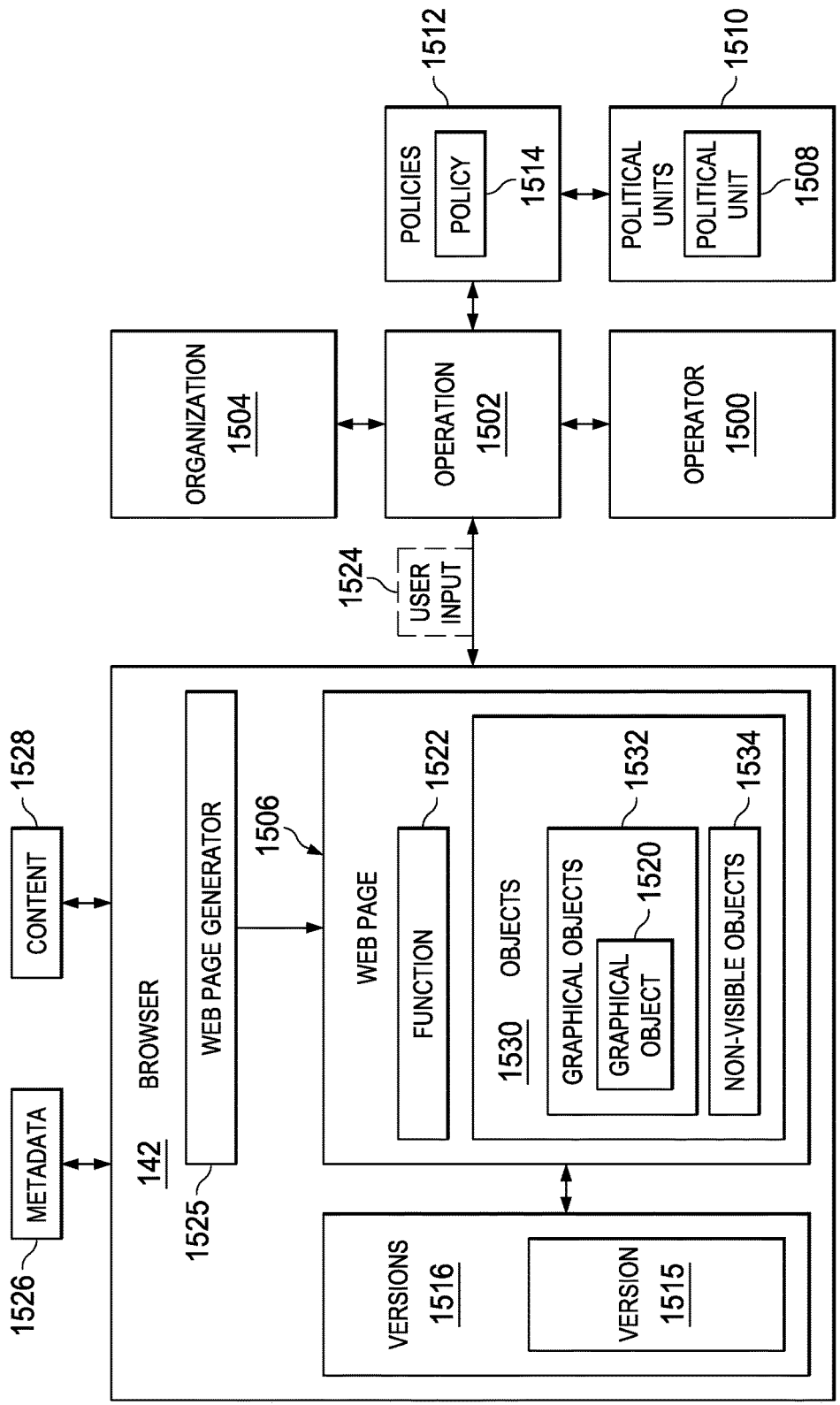
FIG. 15 is an illustration of a block diagram of data flow for displaying a web page based on a policy in accordance with an illustrative embodiment.

With reference to FIG. 15, an illustration of a block diagram of data flow for displaying a web page based on a policy is depicted in accordance with an illustrative embodiment. In this depicted example, operator 1500 performs operation 1502 for organization 1504.

As depicted, operator 1500 uses web page 1506 displayed on browser 142 to perform operation 1502. In this illustrative example, browser 142 is displayed in display system 146 for client data processing system 110 in FIG. 1.

In this illustrative example, organization 1504 may take various forms. For example, organization 1504 may be a company, a charity, an educational group, a social group, a team, a government entity, or some other suitable organization.

As shown, operation 1502 may take various forms. For example, operation 1502 may be selected from one of payroll, benefits enrollment, benefits review, performance review, budgeting, financial forecasting, research, team creation, hiring, or other suitable operations.

In this illustrative example, operation 1502 is performed with respect to one or more of political unit 1508 in political units 1510. In other words, the performance of operation 1502 may be affected by political unit 1508.

Political unit 1508 is an organization of people for a government. For example, a political unit may be selected from one of a country, a state, a province, a multinational grouping, a township, a city, the European Union, or other suitable type of government organizations.

As depicted, political units 1510 have policies 1512. In this illustrative example, political unit 1508 has policy 1514 in policies 1512. Policy 1514 is one or more rules, regulations, laws, or other statements that affect how operation 1502 is to be performed.

Operation 1502 may include performing different tasks, entering different information, or other changes depending on which policy in policies 1512 applies to operation 1502 for a particular political unit in political units 1510. In the illustrative example, version 1515 of web page 1506 is created, taking into account the applicable policy in policies 1512.

For example, policy 1514 for political unit 1508 may affect how operation 1502 is performed when operation 1502 is performed by operator 1500 with respect to political unit 1508. In one illustrative example, when operation 1502 is adding a person to a payroll for benefits, policy 1514 may define what information is required from the person.

Policy 1514 may be different between different political units. For example, France and Germany are examples of two political units. In this example, France may require different information from Germany in what information is required for payroll with respect to information that is collected for purposes of taxes.

As depicted, web page 1506 displayed by browser 142 may have versions 1516. Each version in versions 1516 of web page 1506 meets a corresponding policy in policies 1512 for a particular political unit in political units 1510. For example, version 1515 in versions 1516 of web page 1506 is created when operation 1502 is performed by operator 1500 with respect to political unit 1508 in political units 1510.

In this manner, web page 1506 may be created to perform operation 1502 in a manner that meets each of policies 1512 for each of political units 1510 when performing operation 1502. In this example, operation 1502 is the same but may have different requirements based on the particular one of political units 1510 for which operation 1502 is performed.

In the illustrative example, graphical object 1520 is selected as one that that performs function 1522 for web page 1506 to meet policy 1514 for political unit 1508. As depicted, graphical object 1520 is selected based on an identification of political unit 1508.

The data processing system may be selected from at least one of data processing system 122 or client data processing system 140 in FIG. 1. In other words, the process of creating web page 1506 for display in client data processing system 140 as illustrated in this example may be server side, client side, or a combination of the two.

The data processing system creates web page 1506 that has graphical object 1520 in web page 1506 that performs function 1522 to meet policy 1514 for a political unit in political units 1510. Each political unit in political units 1510 has a different policy in policies 1512 in the depicted example.

Web page 1506 is configured to receive user input 1524 from operator 1500 for operation 1502 performed by operator 1500 with respect to political unit 1508. In this manner, operator 1500 performs operation 1502 using web page 1506 that version 1515 created to take into account policy 1514 for political unit 1508 in performing operation 1502. In other words, web page 1506 is customized for a task performed by operator 1500 that meets policy 1514 for political unit 1508. For example, when web page generator 1525 for browser 142 on client data processing system 140 creates web page 1506, web page 1506 receives metadata 1526 that defines what web page 1506 looks like without content 1528.

In this illustrative example, metadata 1526 defines a group of objects 1530 in web page 1506. The group of objects 1530 includes at least one of a group of graphical objects 1532 or a group of non-visible objects 1535.

The group of graphical objects 1532 includes one or more objects that are visible in web page 1506 when web page 1506 is displayed to operator 1500. The group of graphical objects 1532 may be selected from at least one of a dial, a slider, a button, a radio box, a text field, an image, an embedded video, or other suitable graphical object.

The group of non-visible objects 1535 is one or more objects that are not visible in web page 1506 when web page 1506 is displayed. The group of non-visible objects 1535 may be selected from at least one of a script, program code, or other suitable objects that are not displayed in web page 1506.

In this illustrative example, an object in the group of objects 1530 may have function 1522 that meets policy 1514 for political unit 1508 in political units 1510. For example, the object may be graphical object 1520. Each political unit in political units 1510 has a different policy in policies 1512 in the illustrative example.

As depicted, web page generator 1525 identifies content 1528 needed for web page 1506 based on metadata 1526. Web page generator 1525 obtains content 1528 for web page 1506. In this illustrative example, web page generator 1525 creates web page 1506 using metadata 1526 and content 1528. Web page 1506 may then be displayed on graphical user interface 144 on client data processing system 140 in FIG. 1.

In this manner, the illustrative example depicted in FIG. 15 provides one or more technical solutions that overcome the technical problems of the large amounts of time and effort needed to provide different versions of web pages to perform operations, and insufficient resources for web page servers being present to generate web pages sent to client data processing systems. In this illustrative example, at least one of data processing system 122 or client data processing system 140 operates as a special purpose computer in which web page designer 116 in data processing system 122 enables a more efficient creation of web page 1506 for display in display system 146 on client data processing system 140.

For example, fewer resources are needed on web page server 108 in FIG. 1 to send web page 1506 to client data processing systems 110 that meet policy 1514 for a particular political unit 1508. In other words, different versions of web page 1506 do not need to be stored by web page server 108. Instead, metadata 1526 describes which one of objects 1530 are needed in web page 1506 for a particular one of political units 1510 for which operation 1502 is performed by operator 1500 with respect to the particular one of political units 1510.

Thus, at least one of data processing system 122 or client data processing system 140 operates as a special purpose computer as compared to currently available general purpose computers that do not create web page 1506 in this manner. As a result, at least one of data processing system 122 or client data processing system 140 may operate more efficiently, faster, with fewer resources, or some combination thereof.

Data processing system 122 transforms information 106 such that information 106 has a different function or has a different use. For example, web pages 114 are stored as metadata 1526. Metadata 1526 is transformed into a form for display on graphical user interface 144 in display system 146 for client data processing system 140. In particular, versions 1516 may be generated from metadata 1526 in a manner where each version meets a particular one of policies 1512 for political units 1510 when performing operation 1502 with respect to a particular one of political units 1510.

Figure 16:
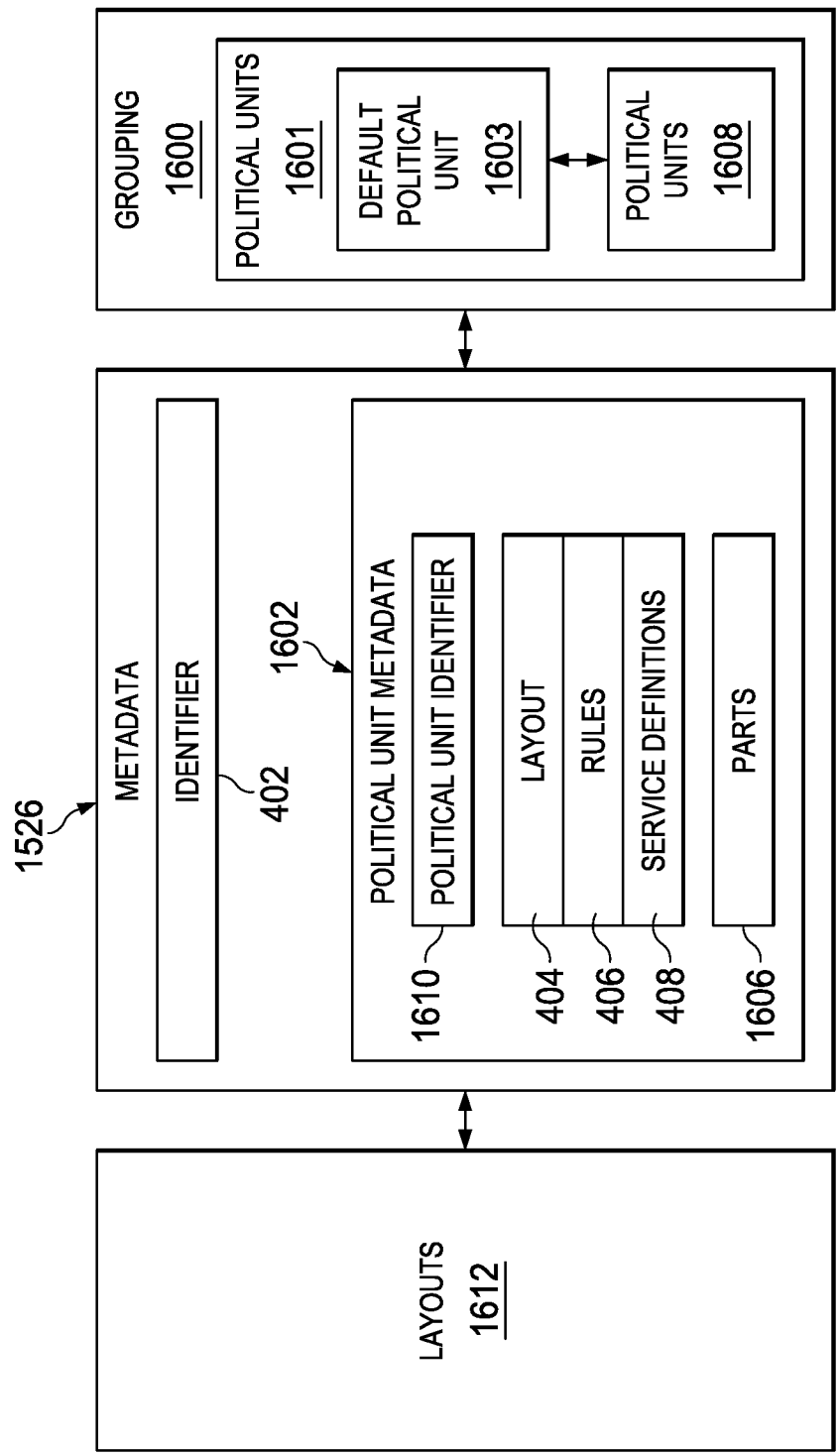
FIG. 16 is an illustration of a block diagram of metadata in accordance with an illustrative embodiment.

With reference next to FIG. 16, an illustration of a block diagram of metadata is depicted in accordance with an illustrative embodiment. Metadata 1526 is an example of metadata for a web page in metadata 136 in FIG. 1. In this illustrative example, metadata 1526 is metadata for web page 1506 that includes rules, service definitions, and objects that take into account policies 1512 for political units 1510.

In this illustration, an example of a number of components of metadata 1526 for web page 1506 is shown. In this illustrative example, metadata 1526 contains metadata for grouping 1600 of political units 1601.

As depicted, political units 1601 are an example of political units 1510 in FIG. 15. Grouping 1600 specifies which political units in political units 1601 are part of other political units in political units 1601.

As depicted, metadata 1526 includes identifier 402 and political unit metadata 1602. As described above in FIG. 4, identifier 402 points to web page 1506.

In this illustrative example, political unit metadata 1602 specifies metadata 1526 for default political unit 1603 in grouping 1600. As depicted, when a political unit in grouping 1600 has parts, the political unit is a default political unit for the parts. In other words, the group of political units which are a part of the political unit uses the political unit as a default political unit.

A default political unit is a political unit that provides metadata that is used as a default for the parts of the political unit. Providing default metadata in metadata 1526 for grouping 1600 of political units 1601 reduces the amount of time needed to design web page 1506 for political units 1601.

A part is a political unit within another political unit. For example, a state is a part of a country.

As depicted, the metadata specified by political unit metadata 1602 includes layout 404, rules 406, service definitions 408, and parts 1606. In the depicted example, metadata 1526 for default political unit 1603 is common to a group of political units 1608 in political units 1601. The group of political units 1608 is part of default political unit 1603.

Political unit identifier 1610 points to a political unit in political units 1601. In this illustrative example, political unit identifier 1610 points to default political unit 1603. For example, political unit identifier 1604 may be the name of default political unit 1603.

In this illustrative example, layout 404 includes objects 1530 selected for default political unit 1603 for web page 1506. As depicted, parts 1606 are a group of political unit metadata 1602 for the group of political units 1608. In this illustrative example, metadata 1526 includes layouts 1612 of groups of objects for political units 1601. Layout 404 for default political unit 1603 is an example of a layout in layouts 1612.

In one illustrative example, default political unit 1603 in grouping 1600 is a country and the group of political units 1608 is a group of states in the country. With this example, parts 1606 are a group of political unit metadata 1602 for the group of states. In this illustrative example, the political unit metadata for a political unit in parts 1606 specifies layout 404, rules 406, service definitions 408, and objects in layout 404 selected for the political unit.

For example, rules 406 in political unit metadata 1602 may include program code for calculating a value for an object in objects 1530 based on user input made to objects 1530. In this example, the program code for calculating the value for the object is executed when user input made to objects 1530 on web page 1506 is received. For example, the value may be the output of an algorithm implemented by the program code in rules 406 for web page 1506 that processes user input made to objects 1530.

In this illustrative example, rules 406 perform function 1522 for web page 1506 to meet policy 1514 for political unit 1508. For example, program code for calculating a value for an object in objects 1530 based on user input to objects 1530 may implement function 1522 for web page 1506 that meets policy 1514 for political unit 1508.

Figure 17:
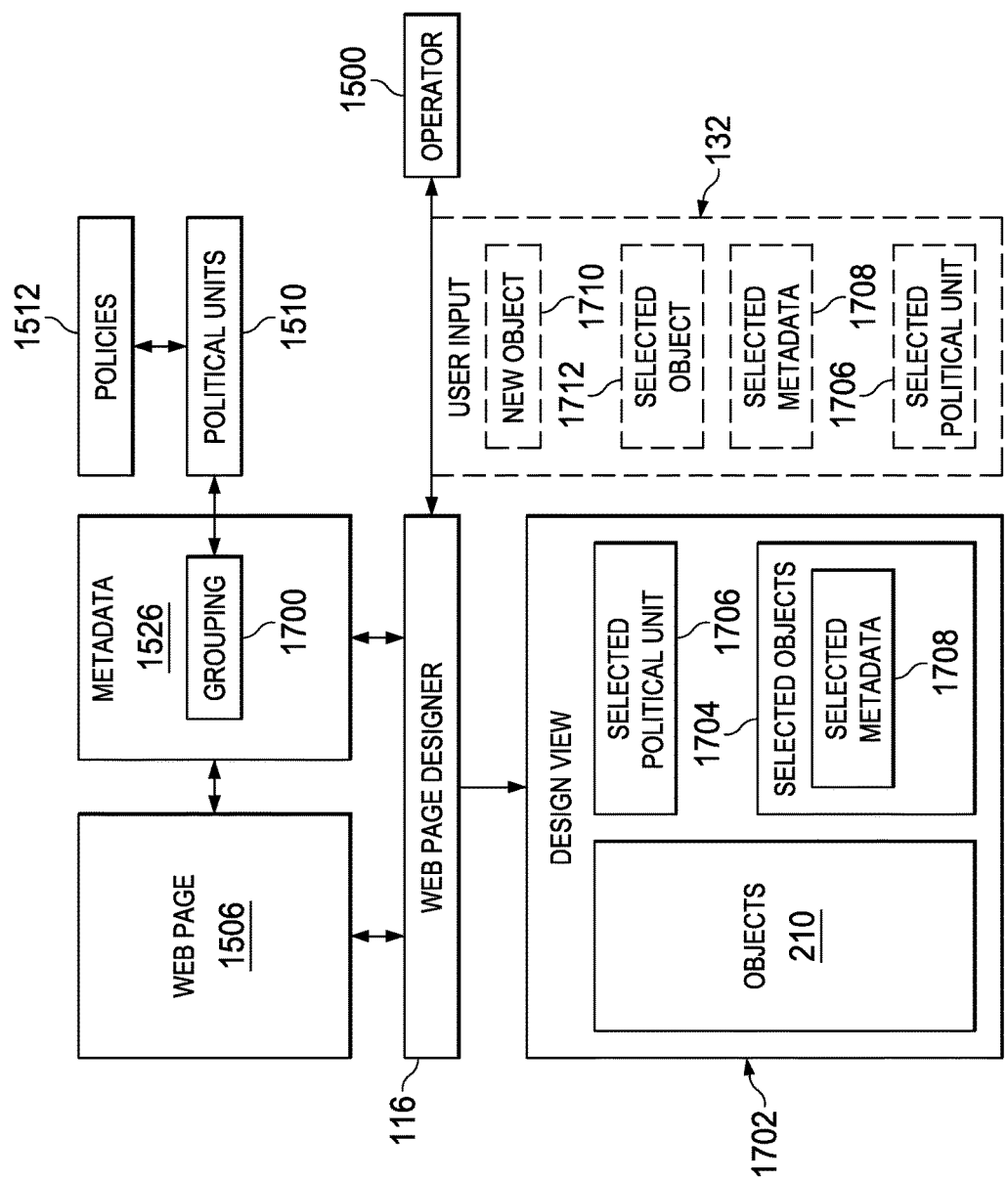
FIG. 17 is an illustration of a block diagram of data flow for designing web pages based on policies of political units in accordance with an illustrative embodiment.

Turning to FIG. 17, an illustration of a block diagram of data flow for designing web pages based on policies of political units is depicted in accordance with an illustrative embodiment. In this figure, an example of data flow for a process for designing metadata 1526 for web page 1506 using web page designer 116 is shown. In this illustrative example, operator 1500 interacts with web page designer 116 and designs metadata 1526 for web page 1506 that takes into account policies 1512 of political units 1510. For example, policies 1512 may have requirements on what information is requested, shown, or processed using web page 1506 when an operator uses web page 1506 to perform operation 1502 for organization 1504.

As depicted, web page designer 116 generates web page 1506 by at least one of creating web page 1506 or modifying web page 1506. Web page designer 116 creates metadata 1526 for web page 1506 when operator 1500 creates web page 1506 interacting with web page designer 116. In this illustrative example, web page designer 116 creates grouping 1700 in metadata 1526 when operator 1500 creates web page 1506 interacting with web page designer 116. Grouping 1700 is an example of grouping 1600 in FIG. 16.

For example, web page designer 116 may create metadata 1526 for web page 1506 using objects selected by operator 1500 for web page 1506 based on policies 1512 of political units 1510. In other words, the presence of objects that take into account policies 1512 of political units 1510 may be initially absent in metadata 1526 when web page designer 116 is being used to create web page 1506.

In this particular example, web page designer 116 retrieves metadata 1526 for web page 1506 when operator 1500 modifies web page 1506. Web page designer 116 receives changes to metadata 1526 through user input 132 as illustrated in this figure. For example, web page designer 116 may receive changes to metadata 1526 to implement policies 1512 of political units 1510.

As depicted, web page designer 116 creates design view 1702. Design view 1702 is an example of design view 209 in FIG. 2. Design view 1702 is an interface displayed by web page designer 116 to operator 1500. In this illustrative example, design view 1702 is used by operator 1500 to visually design web page 1506. The designing of web page 1506 may include creating web page 1506, modifying web page 1506, or some combination thereof.

In displaying design view 1702, web page designer 116 displays objects 210, selected objects 1704 for selected political unit 1706, and selected political unit 1706. Operator 1500 interacts with design view 1702 to design web page 1506.

In this illustrative example, the process includes generating metadata 1526 for web page 1506. For example, web page 1506 may be modified by modifying metadata 1526 for web page 1506 through operator 120 interacting with design view 1702. As depicted, web page designer 116 creates design view 1702. In this example, design view 1702 is configured to receive user input 132. User input 132 is used to generate metadata 1526 for web page 1506.

As shown in this figure, design view 1702 includes objects 210, a group of selected objects 1704 for selected political unit 1706, and selected political unit 1706. As described above in FIG. 2, objects 210 are examples of objects 134 in FIG. 1. In the illustrative example, one or more of objects 210 may be added to the group of selected objects 1704 for selected political unit 1706 through user input 132.

As depicted, web page designer 116 identifies the group of selected objects 1704 from metadata 1526 based on grouping 1700. Web page designer 116 also identifies selected metadata 1708 for the group of selected objects 1704 from metadata 1526.

As depicted, selected metadata 1708 is a portion of metadata 1526 that describes the group of selected objects 1704 for selected political unit 1706 for web page 1506. Web page designer 116 displays the group of selected objects 1704 in design view 1702 based on selected metadata 1708.

In this illustrative example, web page designer 116 receives user input 132 to design view 1702. Web page designer 116 receives selected political unit 1706 from user input 132.

Selected political unit 1706 is a political unit in political units 1510 selected by user input 132. Web page designer 116 sets the group of selected objects 1704 to a group of objects for the political unit in grouping 1700 when selected political unit 1706 is received.

As depicted, web page designer 116 receives new object 1710 in user input 132. New object 1710 is an object that is used to create an object for selected political unit 1706 for web page 1506. For example, new object 1710 may be a button that operator 120 adds to web page 1506.

Operator 120 may identify new object 1710 in user input 132 selecting new object 1710 in objects 210. For example, user input 132 may be a drag and drop operation of new object 1710 from objects 210 to the group of selected objects 1704 for selected political unit 1706.

As depicted, web page designer 116 receives selected object 1712 in user input 132. Selected object 1712 is an object selected from the group of selected objects 1704 for selected political unit 1706. Web page designer 116 displays selected metadata 1708 for selected object 1712 when selected object 1712 is received.

Web page designer 116 receives selected metadata 1708 from user input 132. Selected metadata 1708 is based on user input that is at least one of creating selected metadata 1708 for selected objects 1704 or changing selected metadata 1708 for selected objects 1704.

In this illustrative example, web page designer 116 modifies metadata 1526 based on changes to the group of selected objects 1704 for selected political unit 1706 and selected metadata 1708. For example, when new object 1710 is added to the group of selected objects 1704 for selected political unit 1706 in design view 1702, web page designer 116 also adds new object 1710 to metadata 1526.

Figure 18:
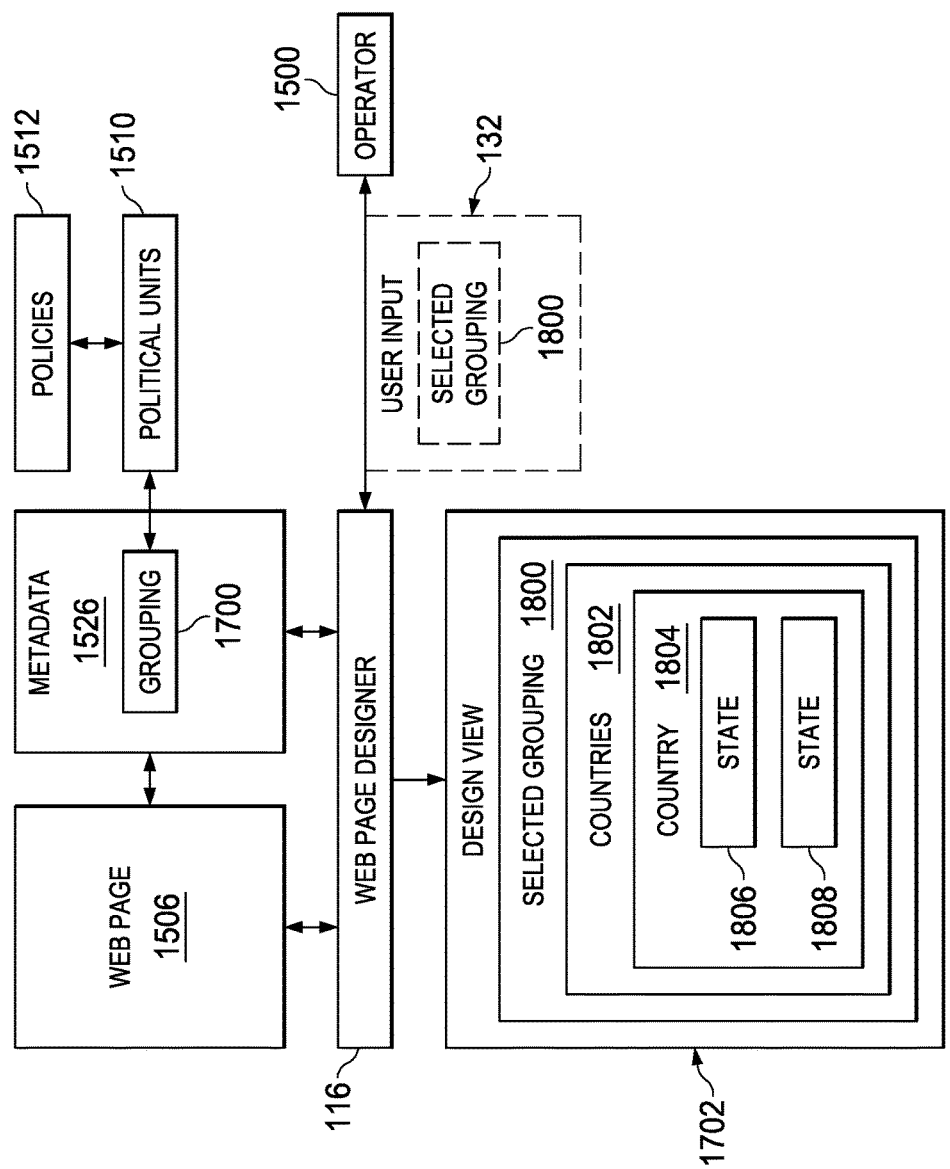
FIG. 18 is an illustration of a block diagram of data flow for selecting a grouping of political units for a web page in accordance with an illustrative embodiment.

Turning next to FIG. 18, an illustration of a block diagram of data flow for selecting a grouping of political units for a web page is depicted in accordance with an illustrative embodiment. In this figure, an example of data flow for a process for selecting grouping 1700 of political units 1510 in metadata 1526 for web page 1506 through web page designer 116 is shown. In this illustration, web page designer 116 is used by operator 1500 to select grouping 1700 for web page 1506 that implements policies 1512 of political units 1510.

In this illustrative example, design view 1702 displays selected grouping 1800. As depicted, selected grouping 1800 is a grouping of political units 1510. Web page designer 116 receives selected grouping 1800 from user input 132 to design view 1702. Web page designer 116 sets grouping 1700 to selected grouping 1800 when web page designer 116 receives selected grouping 1800.

As depicted, selected grouping 1800 specifies which political units in political units 1510 are part of other political units in political units 1510. In this illustrative example, selected grouping 1800 includes a group of countries 1802. The group of countries 1802 is selected from at least one of The Americas, The European Union, Asia Pacific, North America, or other suitable group of countries.

In the illustrative example, country 1804 is a part of countries 1802. State 1806 and state 1808 are parts of country 1804 in this illustrative example.

In this illustrative example, the group of countries 1802 is a default political unit in selected grouping 1800 for country 1804, state 1806, and state 1808. Country 1804 is a default political unit for state 1806 and state 1808.

Figure 19:
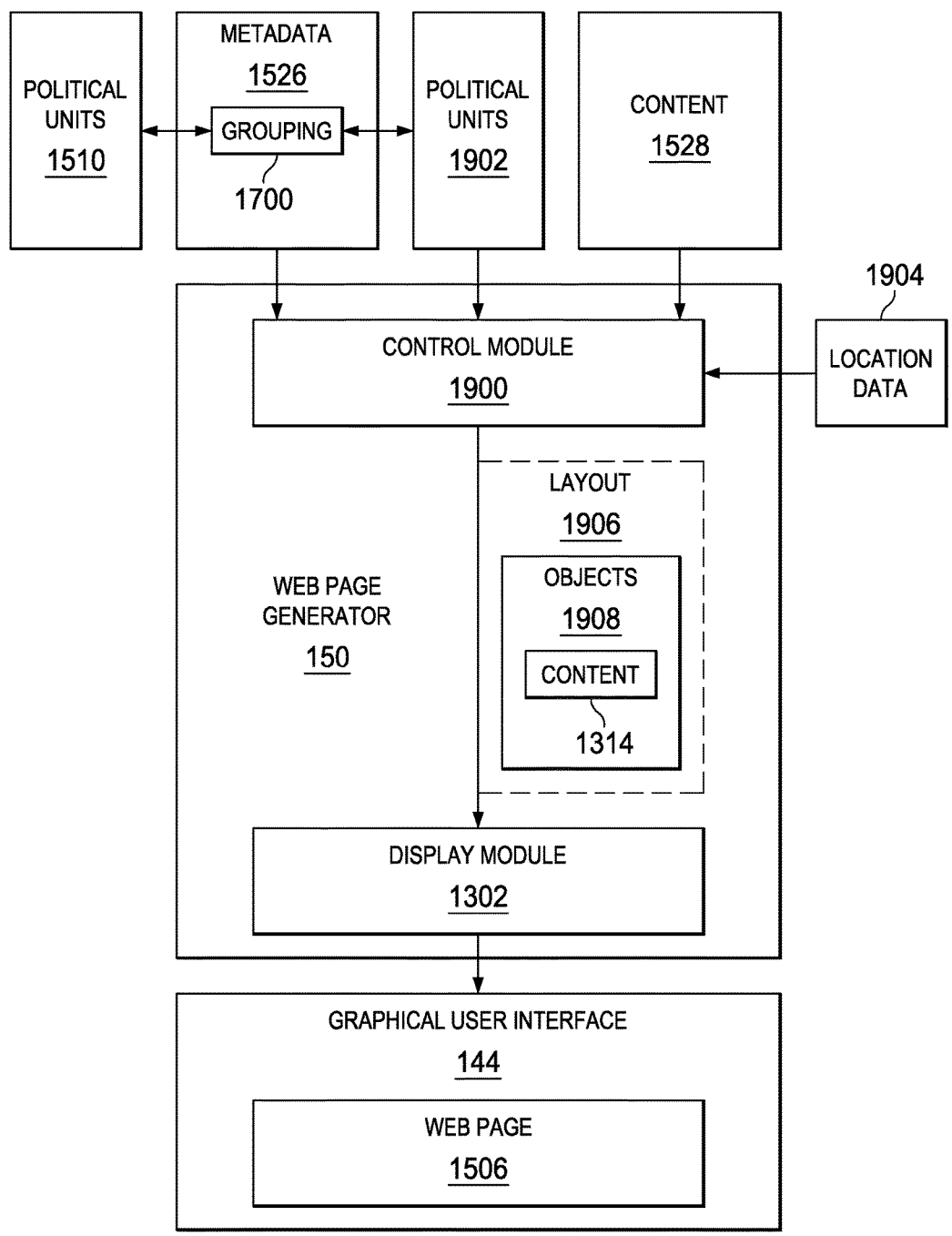
FIG. 19 is an illustration of a block diagram of data flow for displaying a web page based on a grouping of political units in accordance with an illustrative embodiment.

Turning now to FIG. 19, an illustration of a block diagram of data flow for displaying a web page based on a grouping of political units is depicted in accordance with an illustrative embodiment. In this depicted example, the data flow may be implemented in client data processing system 140 to display web page 1506. In this example, web page 1506 has been designed using web page designer 116 in data processing system 122. In this illustration, web page generator 150 displays web page 1506 based on grouping 1700 of political units 1510.

In this figure, an example of data flow for a process that displays web page 1506 through web page generator 150 is shown. In this illustration, web page generator 150 is a program. For example, web page generator 150 may be implemented as a browser.

In this illustrative example, web page generator 150 includes control module 1900 and display module 1302. Control module 1900 receives metadata 1526 describing web page 1506. As depicted, metadata 1526 includes grouping 1700 of political units 1510.

Control module 1900 identifies a group of political units 1902 based on location data 1904. Location data 1904 is at least one of a location where client data processing system 140 is located or a location where selected group of political units 1510 is located. In the illustrative example, location data 1904 may be at least one of an address, a phone number, an internet protocol address, global positioning system coordinates, or some other suitable type of location information that can be used to identify a political unit.

Control module 1900 identifies layout 1906 for web page 1506 from metadata 1526. As depicted, layout 1906 specifies the layout of objects 1908 in web page 1506. Control module 1900 identifies objects 1908 from metadata 1526 based on the group of political units 1902. Layout 1906 is an example of layout 404 in FIG. 5. Objects 1908 are examples of objects 504 in FIG. 6.

Control module 1900 identifies content 1528 needed for web page 1506 based on metadata 1526. Control module 1900 obtains content 1528 for web page 1506. For example, control module 1900 may obtain content 1528 from at least one of database 107 in FIG. 1 or some other suitable location where content 1528 is stored.

Control module 1900 places content 1528 into objects 1908 based on metadata 1526. For example, when an attribute in metadata for an object points to content, control module 1900 places the content into the object.

As depicted, display module 1302 receives layout 1906 from control module 1900. Display module 1302 creates web page 1506 using layout 1906. Display module 1302 then displays web page 1506 on graphical user interface 144.

Figure 20:
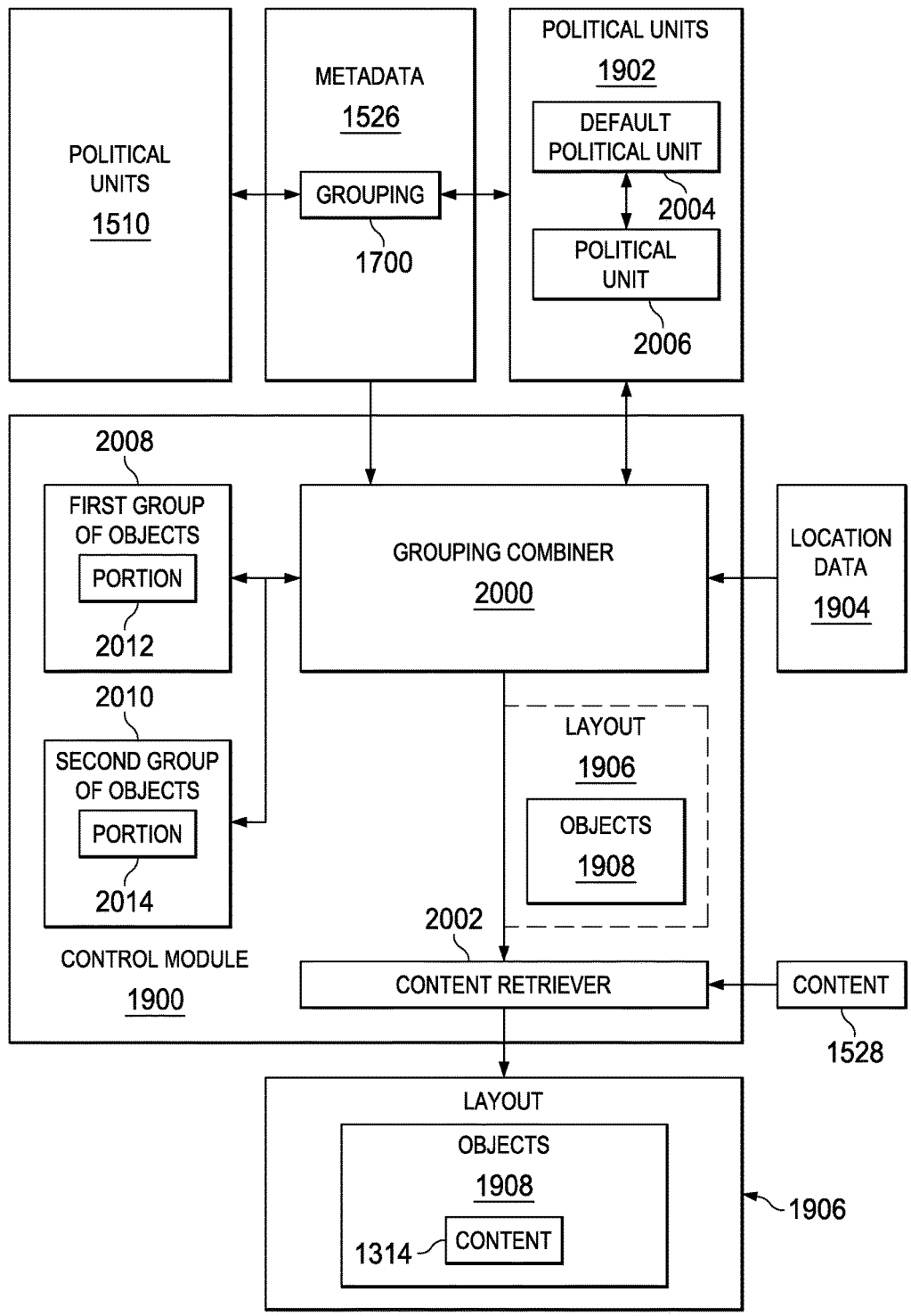
FIG. 20 is an illustration of a block diagram of data flow for a control module in accordance with an illustrative embodiment.

With reference to FIG. 20, an illustration of a block diagram of data flow for a control module is depicted in accordance with an illustrative embodiment. In this depicted example, the data flow may be implemented in client data processing system 140 to generate layout 1906 for web page 1506. In this illustration, grouping 1700 enables control module 1900 of web page generator 150 to combine groups of objects 134 selected for the group of political units 1902 into objects 1908 for web page 1506.

For example, grouping 1700 may include a political unit representing a country. In this example, grouping 1700 also may include another political unit representing a state which is a part of the country.

In this illustrative example, control module 1900 combines a group of objects 1530 selected for the country and another group of objects 1530 selected for the state. The combination of these groups of objects is used to form objects 1908 in layout 1906 for web page 1506. As depicted, layout 1906 includes the group of objects 1530 for the country and the group of objects 1530 for the state.

In this figure, an example of data flow for a process that generates layout 1906 is shown. In this illustrative example, control module 1900 includes grouping combiner 2000 and content retriever 2002. Grouping combiner 2000 receives metadata 1526 describing web page 1506. As depicted, metadata 1526 includes grouping 1700 of political units 1510.

In this illustrative example, grouping combiner 2000 identifies the group of political units 1902 based on location data 1904. In the illustrative example, the group of political units 1902 includes default political unit 2004 and political unit 2006. Political unit 2006 is a part of default political unit 2004. Grouping combiner 2000 also identifies layout 1906 for web page 1506 from metadata 1526.

As depicted, grouping combiner 2000 identifies first group of objects 2008 selected for political unit 2006 from metadata 1526. Grouping combiner 2000 also identifies second group of objects 2010 selected for default political unit 2004 from metadata 1526.

Additionally, grouping combiner 2000 identifies portion 2012 of first group of objects 2008 for political unit 2006 that does not replace portion 2014 of second group of objects 2010 for default political unit 2004. Grouping combiner 2000 generates objects 1908 from first group of objects 2008 for political unit 2006 and portion 2014 of second group of objects 2010. In the illustrative example, objects 1908 for web page 1506 form first group of objects 2008 for political unit 2006 combined with second group of objects 2010 for default political unit 2004.

For example, default political unit 2004 may represent a state and default political unit 2004 may represent a city which is a part of the state. In this example, grouping combiner 2000 may combine second group of objects 2010 selected for the state and first group of objects 2008 selected for the city. The combination of these groups of objects forms objects 1908 in layout 1906 for web page 1506 that includes second group of objects 2010 selected for the state and first group of objects 2008 selected for the city.

In this illustrative example, content retriever 2002 identifies content 1528 needed for web page 1506 based on metadata 1526. Content retriever 2002 obtains content 1528 for web page 1506. As depicted, content retriever 2002 then places content 1528 into objects 1908 based on metadata 1526.

The illustration of data flow and components for displaying web pages and designing web pages shown in FIGS. 15-20 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, the example of web page generator 150 in FIG. 19 may also be implemented as at least one of a module in modules 1400 in browser 142, a plug-in for browser 142, an extension for browser 142, as part of browser 142, or in some other suitable manner.

Figure 21:
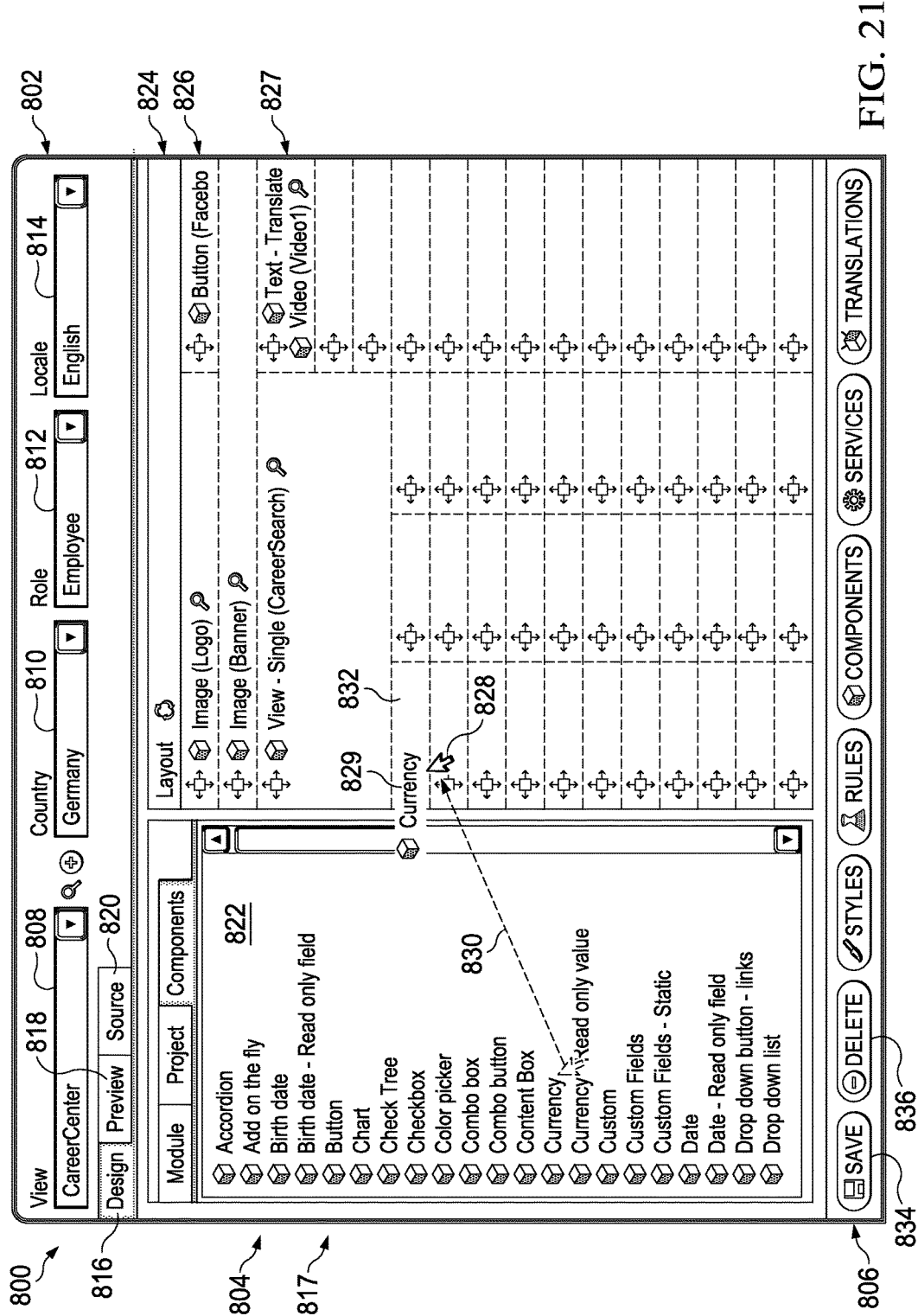
FIG. 21 is an illustration of a graphical user interface for designing a web page based on policies of political units in accordance with an illustrative embodiment.
Figure 22:
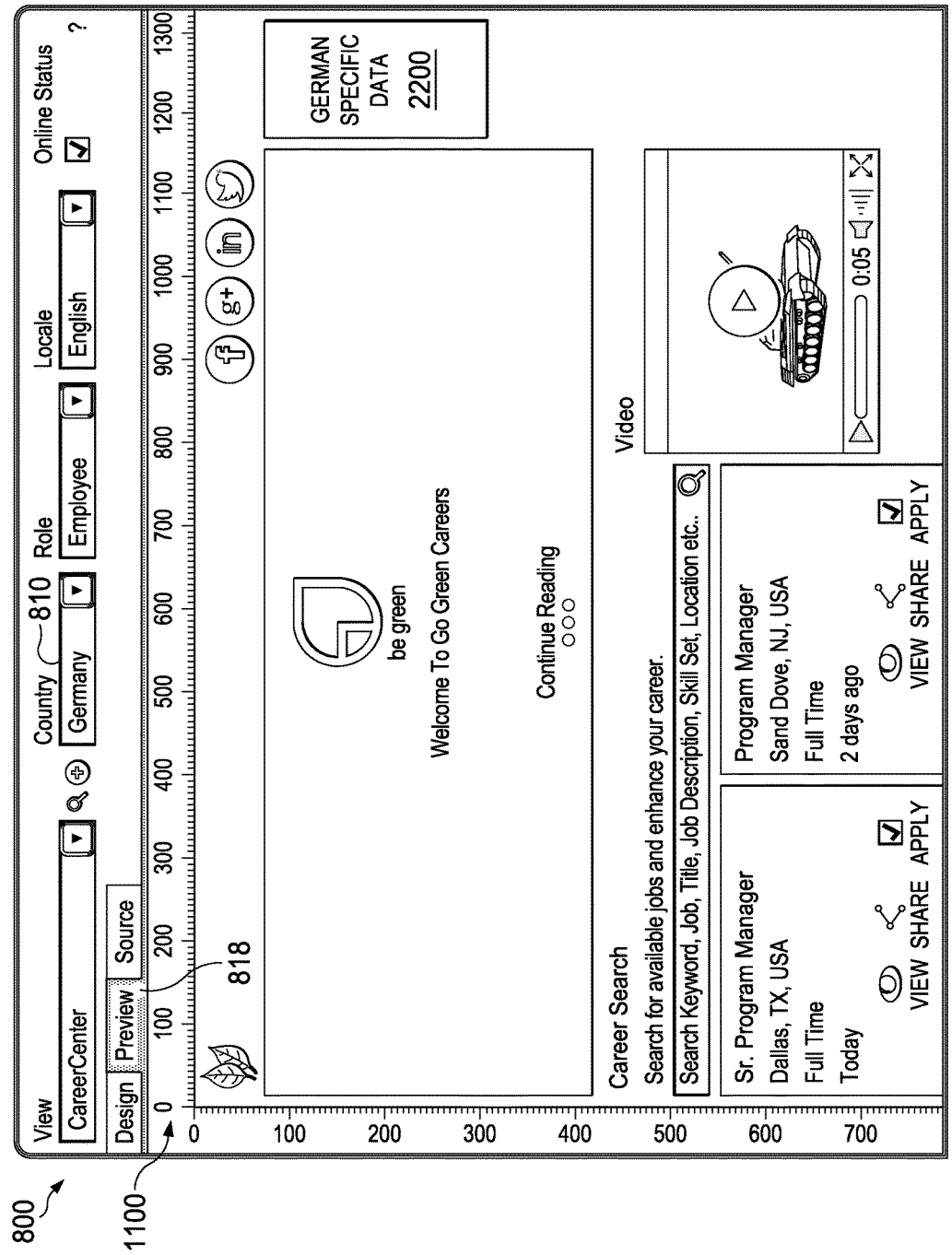
FIG. 22 is an illustration of a graphical user interface for displaying a preview of a web page based on a policy of a political unit in accordance with an illustrative embodiment.

FIGS. 21-22 are illustrative examples of a graphical user interface that may be used to design a web page based on policies of political units. With reference first to FIG. 21, an illustration of a graphical user interface for designing a web page based on policies of political units is depicted in accordance with an illustrative embodiment. In this illustration, drop down list 810 is set to Germany. In this illustrative example, selecting Germany in drop down list 810 is a preference selected by operator 120. Germany is an example of a political unit in political units 1510. As depicted, when Germany is selected in drop down list 810, layout 824 is for Germany and objects 827 in layout 824 are also for Germany.

With reference next to FIG. 22, an illustration of a graphical user interface for displaying a preview of a web page based on a policy of a political unit is depicted in accordance with an illustrative embodiment. In this illustration, tab 818 has been selected and drop down list 810 is set to Germany.

As depicted, graphical user interface 800 is showing preview 1100 for web page 118. Preview 1100 is an example of preview 138 shown in block form in FIGS. 1-2. In this illustrative example, preview 1100 includes German specific data 2200. German specific data 2200 is displayed when an object in objects 827 in layout 824 for Germany has been selected that shows German specific data 2200.

Figure 23:
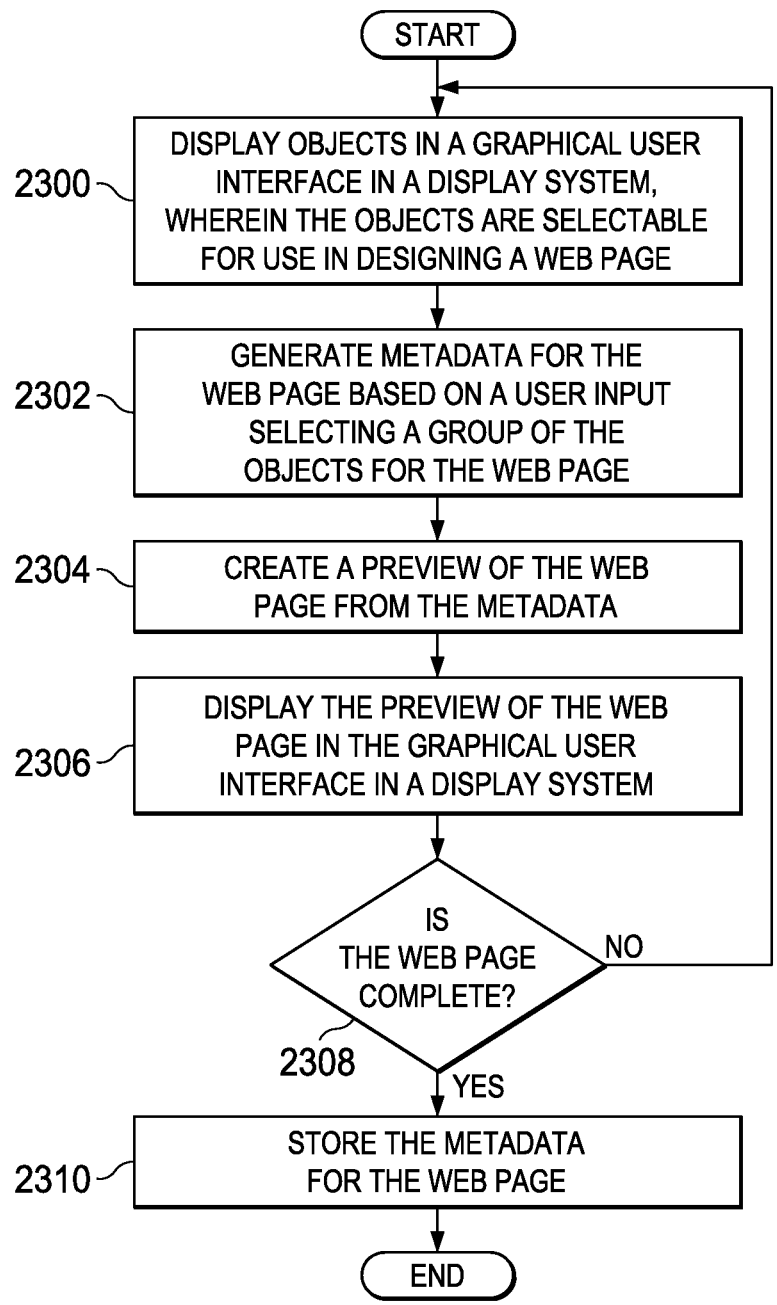
FIG. 23 is an illustration of a flowchart of a process for designing a web page in accordance with an illustrative embodiment.

Turning next to FIG. 23, an illustration of a flowchart of a process for designing a web page is depicted in accordance with an illustrative embodiment. The process illustrated in FIG. 23 may be implemented in information environment 100 shown in block form in FIG. 1. For example, the process may be implemented in web page designer 116 in information system 102.

The process begins by displaying objects in a graphical user interface in a display system, wherein the objects are selectable for use in designing a web page (step 2300). The process generates metadata for the web page based on a user input selecting a group of the objects for the web page (step 2302). The metadata describes the web page.

The process creates a preview of the web page from the metadata (step 2304). The process then displays the preview of the web page in the graphical user interface in a display system (2306).

A determination is made as to whether the web page is complete (step 2308). At this point, the web page may or may not be complete. For example, the preview may be only a portion of the web page as designed thus far.

If the web page is complete, the process stores the metadata for the web page (step 2310) with the process terminating thereafter. For example, the web page may be stored with web pages 114 for distribution by web page server 108. If the web page is not complete, the process returns to step 2300.

Figure 24:
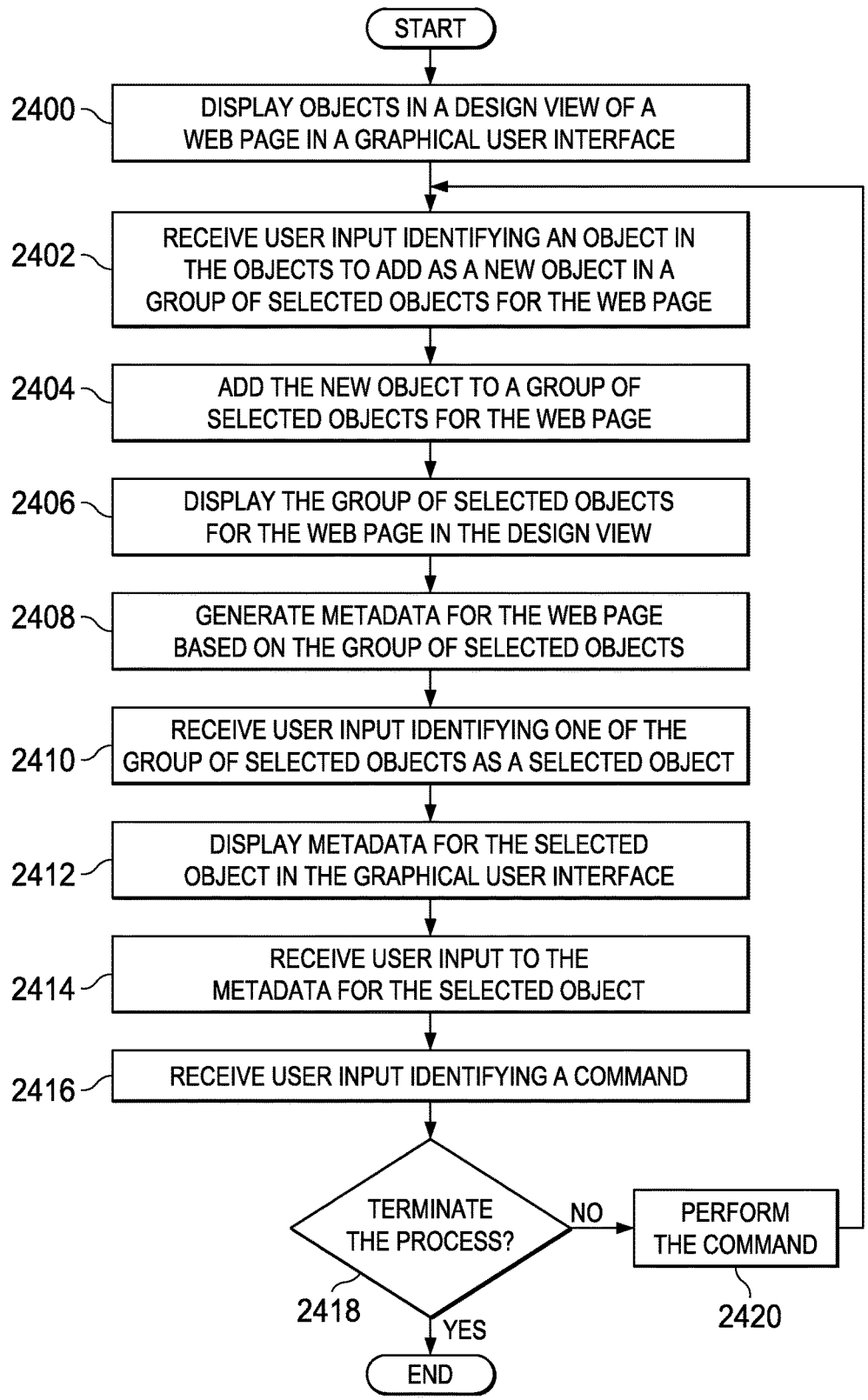
FIG. 24 is an illustration of a flowchart of a process for designing a web page in accordance with an illustrative embodiment.

Turning next to FIG. 24, an illustration of a flowchart of a process for designing a web page is depicted in accordance with an illustrative embodiment. The process illustrated in FIG. 24 may be implemented in information environment 100 shown in block form in FIG. 1 and FIG. 2. For example, the process may be implemented in web page designer 116 in information system 102 in FIG. 1 and the data flow shown in FIG. 2.

The process begins by displaying objects in a design view of a web page in a graphical user interface (step 2400). In step 2400, the design view may be displayed in a web page of a browser in the graphical user interface.

The process receives user input identifying an object in the objects to add as a new object in a group of selected objects for the web page (step 2402). The process adds the new object to a group of selected objects for the web page (step 2404). The process then displays the group of selected objects for the web page in the design view (step 2406).

The process generates metadata for the web page based on the group of selected objects (step 2408). The metadata describes the web page.

The process receives user input identifying one of the group of selected objects as a selected object (step 2410). The process then displays metadata for the selected object in the graphical user interface (step 2412). The process receives user input to the metadata for the selected object (step 2414). The user input to the metadata for the selected object at least one of creates or modifies the metadata for the selected object.

The process next receives user input identifying a command (step 2416). The command is at least one of retrieving the metadata for a web page, storing the metadata for the web page, generating a preview of the web page based on the metadata, generating a design view of the web page based on the metadata, or terminating the process.

A determination is made as to whether the command is to terminate the process (step 2418). If the command is to terminate the process, the process terminates. Otherwise the process performs the command (step 2420) and returns to step 2402.

Figure 25:
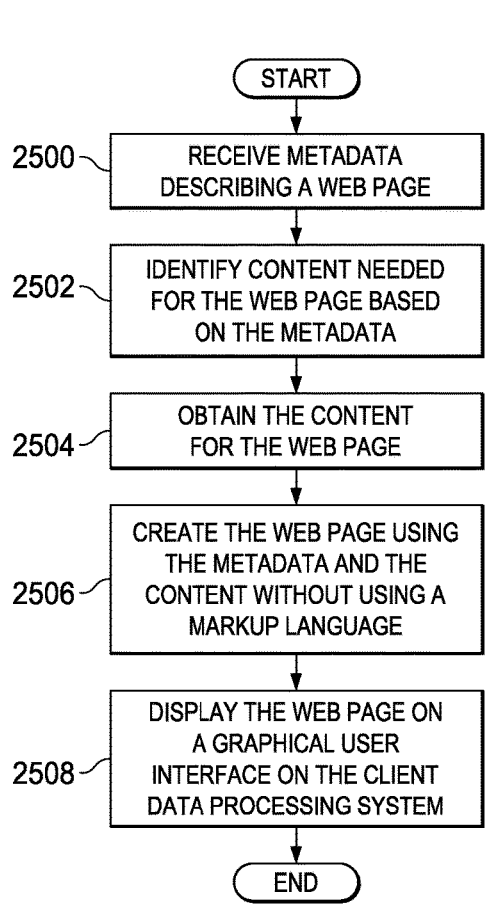
FIG. 25 is an illustration of a flowchart of a process for displaying a web page in accordance with an illustrative embodiment.

Turning next to FIG. 25, an illustration of a flowchart of a process for displaying a web page is depicted in accordance with an illustrative embodiment. The process illustrated in FIG. 25 may be implemented in information environment 100 shown in block form in FIG. 1. For example, the process may be implemented using web page generator 150 in client data processing system 140.

The process begins by receiving metadata describing a web page (step 2500). In this illustrative example, the metadata may be received from different sources. For example, the metadata may be received from a web page server, a local cache on the client data processing system, a proxy server, or some other suitable source. The metadata defines what the web page looks like without content for the web page.

The process identifies content needed for the web page based on the metadata (step 2502). The process then obtains the content for the web page (step 2504).

The process creates the web page using the metadata and the content without using a markup language (step 2506). The process displays the web page on a graphical user interface on the client data processing system (step 2508) with the process terminating thereafter.

Figure 26:
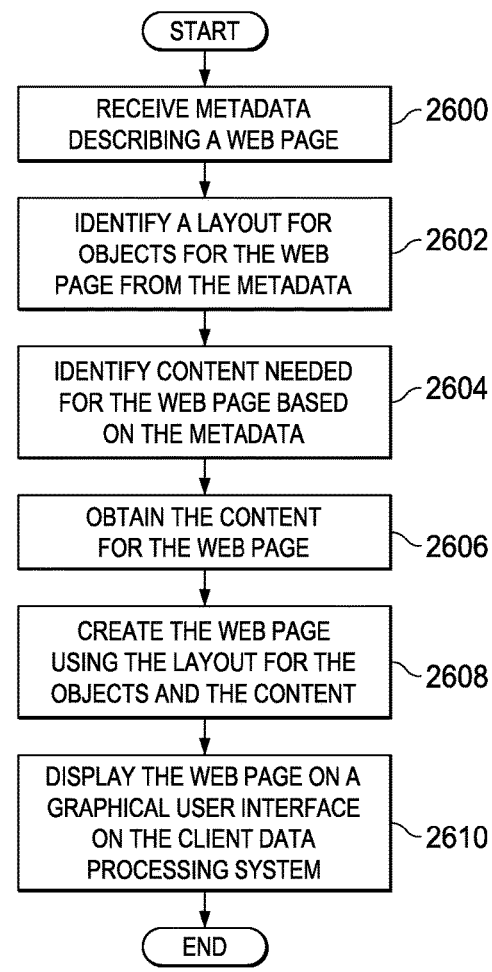
FIG. 26 is an illustration of a flowchart of a process for displaying a web page in accordance with an illustrative embodiment.

Turning next to FIG. 26, an illustration of a flowchart of a process for displaying a web page is depicted in accordance with an illustrative embodiment. The process illustrated in FIG. 26 may be implemented in information environment 100 shown in block form in FIG. 1. For example, the process may be implemented using web page generator 150 in client data processing system 140.

The process begins by receiving metadata describing a web page (step 2600). The process identifies a layout for objects for the web page from the metadata (step 2602). The web page is an example of web page 1306 and the metadata is an example of metadata 1304.

The process identifies content needed for the web page based on the metadata (step 2604). The process then obtains the content for the web page (step 2606).

The process creates the web page using the layout for the objects and the content (step 2608). The process displays the web page on a graphical user interface on the client data processing system (step 2610) with the process terminating thereafter.

As an example, in step 2608, the process may use web page generator 150 to generate document object model tree 1406 in browser 142. In this example, web page generator 150 uses document object model interface 1404 to generate document object model tree 1406 from the layout for the objects and the content. In this example, the process uses browser 142 to display the web page based on document object model tree 1406 in step 2610.

Figure 27:
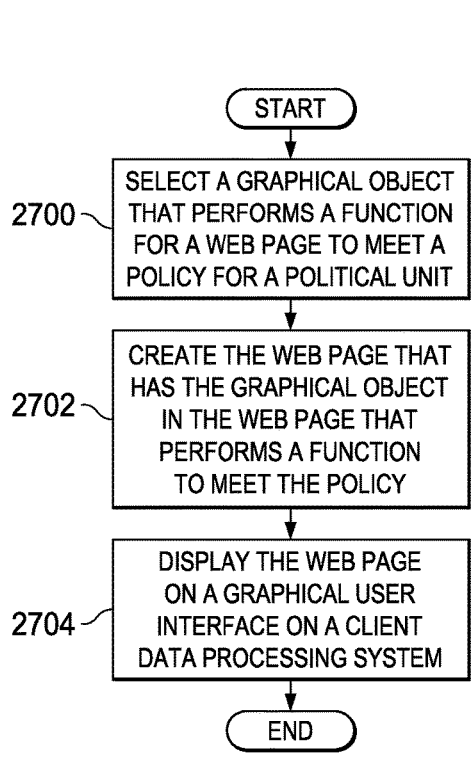
FIG. 27 is an illustration of a flowchart of a process for displaying a web page in accordance with an illustrative embodiment.

With reference now to FIG. 27, an illustration of a flowchart of a process for displaying a web page is depicted in accordance with an illustrative embodiment. The process illustrated in FIG. 27 may be implemented in computer system 124 or client data processing systems 110 in FIG. 1. In particular, the process may be implemented by at least one of web page server 108 in data processing system 122 or web page generator 150 in client data processing system 140. These components may follow the data flow described in FIG. 15.

The process begins by selecting a graphical object that performs a function for a web page to meet a policy for a political unit (step 2700). In step 2700, the graphical object is selected based on an identification of the political unit.

The process creates the web page that has the graphical object in the web page that performs a function to meet the policy (step 2702). The web page created in step 2702 is configured to receive a user input from an operator for an operation performed by the operator with respect to the political unit.

The process displays the web page on a graphical user interface on a client data processing system (step 2704). The process terminates thereafter.

Figure 28:
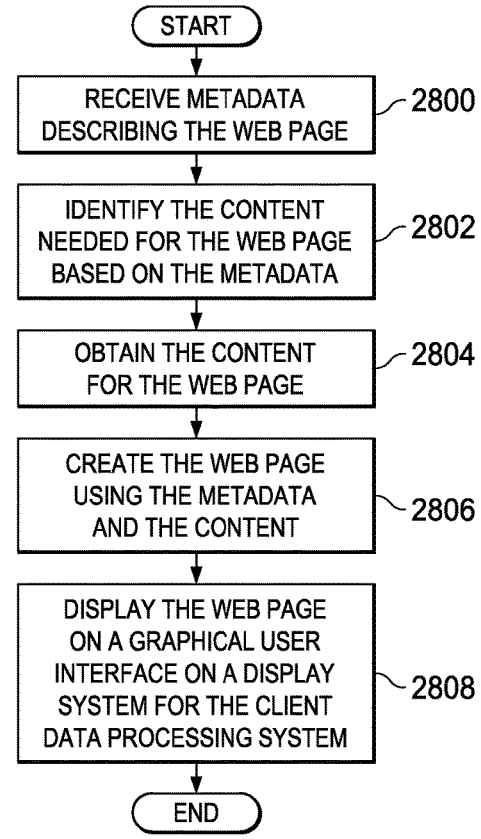
FIG. 28 is an illustration of a flowchart of a process for displaying a web page in accordance with an illustrative embodiment.

Turning to FIG. 28, another illustration of a flowchart of a process for displaying a web page is depicted in accordance with an illustrative embodiment. The process illustrated in FIG. 28 may be implemented in client data processing systems 110 in FIG. 1. In particular, the process may be implemented by at least one of web page server 108 in data processing system 122 or web page generator 150 in client data processing system 140. These components may follow the data flow described in FIG. 15.

The process begins by receiving metadata describing the web page (step 2800). In step 2800, the metadata defines what the web page looks like without content for the web page. For example, the metadata defines a group of objects in the web page and an object in the group of objects has a function that meets a policy for a political unit.

The process identifies the content needed for the web page based on the metadata (step 2802). The process obtains the content for the web page (step 2804). The process also creates the web page using the metadata and the content (step 2806). The process then displays the web page on a graphical user interface on a display system for the client data processing system (step 2808) with the process terminating thereafter.

Figure 29:
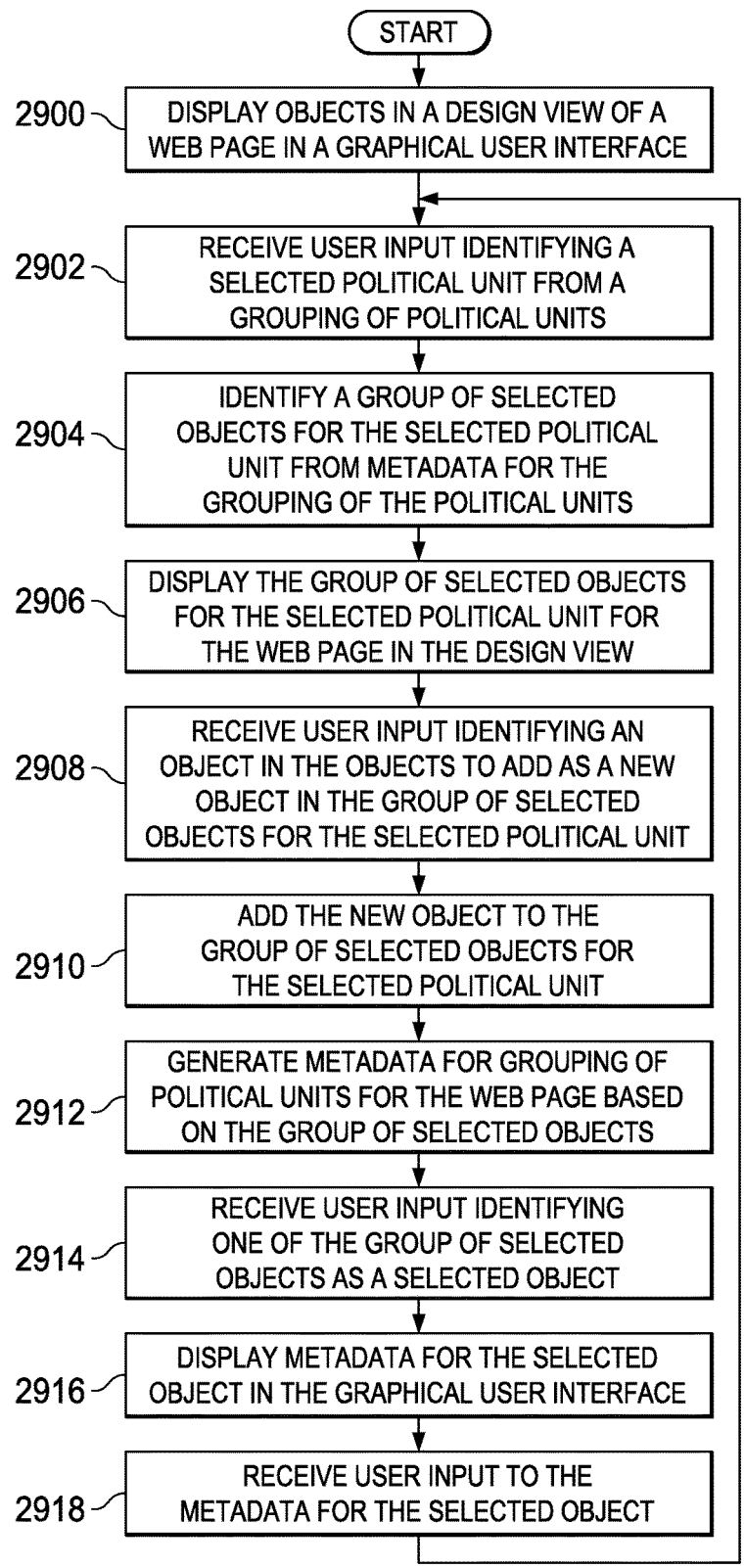
FIG. 29 is an illustration of a flowchart of a process for displaying a web page based on policies of political units in accordance with an illustrative embodiment.

Turning next to FIG. 29, an illustration of a flowchart of a process for displaying a web page based on policies of political units is depicted in accordance with an illustrative embodiment. The process illustrated in FIG. 29 may be implemented in computer system 124 or client data processing systems 110 in FIG. 1. In particular, the process may be implemented by at least one of web page server 108 in data processing system 122 or web page generator 150 in client data processing system 140. These components may follow the data flow described in FIG. 17.

The process begins by displaying objects in a design view of a web page in a graphical user interface (step 2900). In step 2900, the design view may be displayed in a web page of a browser in the graphical user interface.

The process receives user input identifying a selected political unit from a grouping of political units (step 2902). The process identifies a group of selected objects for the selected political unit from metadata for the grouping of the political units (step 2904). The process displays the group of selected objects for the selected political unit for the web page in the design view (step 2906).

The process receives user input identifying an object in the objects to add as a new object in the group of selected objects for the selected political unit (step 2908). The process adds the new object to the group of selected objects for the selected political unit (step 2910). The process generates metadata for grouping of political units for the web page based on the group of selected objects (step 2912). The metadata describes the web page.

The process receives user input identifying one of the group of selected objects as a selected object (step 2914). The process then displays metadata for the selected object in the graphical user interface (step 2916). The process receives user input to the metadata for the selected object (step 2918). The user input to the metadata for the selected object at least one of creates or modifies the metadata for the selected object. The process then returns to step 2902.

Figure 30:
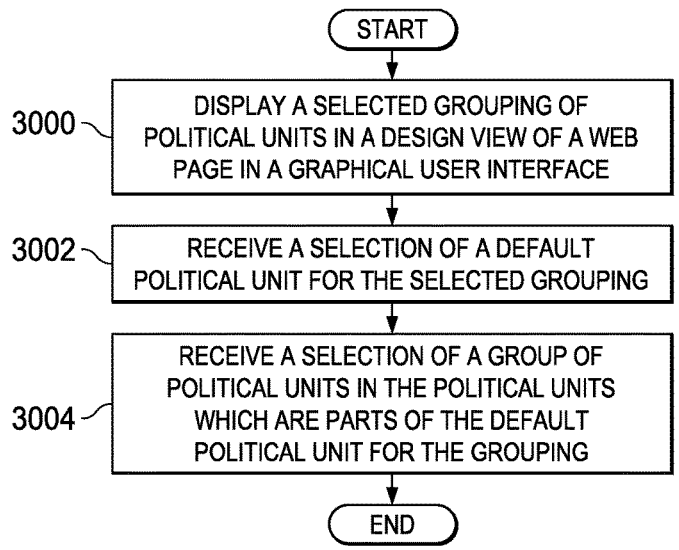
FIG. 30 is an illustration of a flowchart of a process for selecting a grouping of political units for a web page in accordance with an illustrative embodiment.

Turning now to FIG. 30, an illustration of a flowchart of a process for selecting a grouping of political units for a web page is depicted in accordance with an illustrative embodiment. The process illustrated in FIG. 30 may be implemented in computer system 124 or client data processing systems 110 in FIG. 1. In particular, the process may be implemented by at least one of web page server 108 in data processing system 122 or web page generator 150 in client data processing system 140. These components may follow the data flow described in FIG. 18.

The process begins by displaying a selected grouping of political units in a design view of a web page in a graphical user interface (step 3000). The process receives a selection of a default political unit for the selected grouping (step 3002). The process then receives a selection of a group of political units in the political units which are parts of the default political unit for the grouping (step 3004) with the process terminating thereafter.

Figure 31:
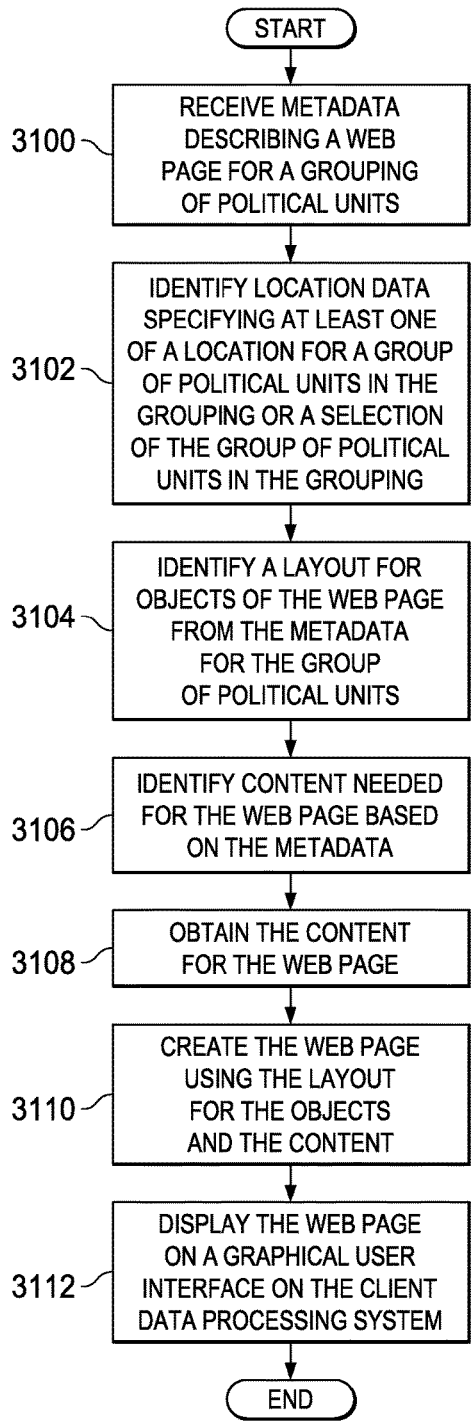
FIG. 31 is an illustration of a flowchart of a process for displaying a web page based on a grouping of political units in accordance with an illustrative embodiment.

Turning to FIG. 31, an illustration of a flowchart of a process for displaying a web page based on a grouping of political units is depicted in accordance with an illustrative embodiment. The process illustrated in FIG. 31 may be implemented in information environment 100 shown in block form in FIG. 1. For example, the process may be implemented using web page generator 150 in client data processing system 140. These components may follow the data flow described in FIG. 19.

The process begins by receiving metadata describing a web page for a grouping of political units (step 3100). The web page is an example of web page 1506 and the metadata is an example of metadata 1526.

The process identifies location data specifying at least one of a location for a group of political units in the grouping or a selection of the group of political units in the grouping (step 3102). The process identifies a layout for objects of the web page from the metadata for the group of political units (step 3104).

The process identifies content needed for the web page based on the metadata (step 3106). The process then obtains the content for the web page (step 3108). The process creates the web page using the layout for the objects and the content (step 3110). The process displays the web page on a graphical user interface on the client data processing system (step 3112) with the process terminating thereafter.

Figure 32:
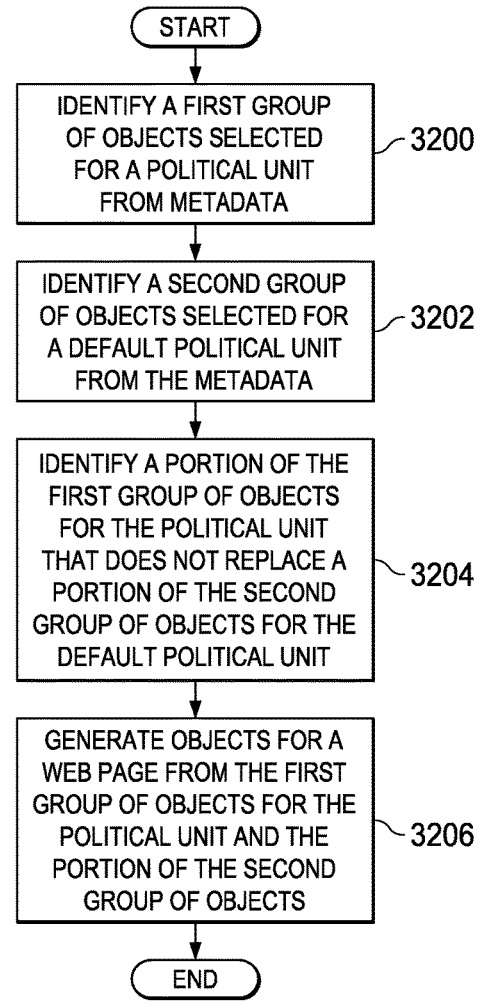
FIG. 32 is an illustration of a flowchart of a process for combining groups of objects for political units in accordance with an illustrative embodiment.

With reference to FIG. 32, an illustration of a flowchart of a process for combining groups of objects for political units is depicted in accordance with an illustrative embodiment. The process illustrated in FIG. 32 may be implemented in information environment 100 shown in block form in FIG. 1. For example, the process may be implemented using web page generator 150 in client data processing system 140. These components may follow the data flow described in FIG. 20.

The process begins by identifying a first group of objects selected for a political unit from metadata (step 3200). The process identifies a second group of objects selected for a default political unit from the metadata (step 3202). The process identifies a portion of the first group of objects for the political unit that does not replace a portion of the second group of objects for the default political unit (step 3204). The process then generates objects for a web page from the first group of objects for the political unit and the portion of the second group of objects (step 3206) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the process in FIG. 26 may perform steps 2606 substantially concurrently with steps 2608 and 2610. In this example, the web page is displayed on the client data processing system as the content is obtained in step 2606.

As another example, the content may be obtained in step 2606 from a stored copy of the content located in a cache of content in the client data processing system. For example, when the process obtains the content in step 2606, the process may also store the content in the cache in the client data processing system for use at a subsequent time in which the process obtains the content from the cache in client data processing system.

Figure 33:
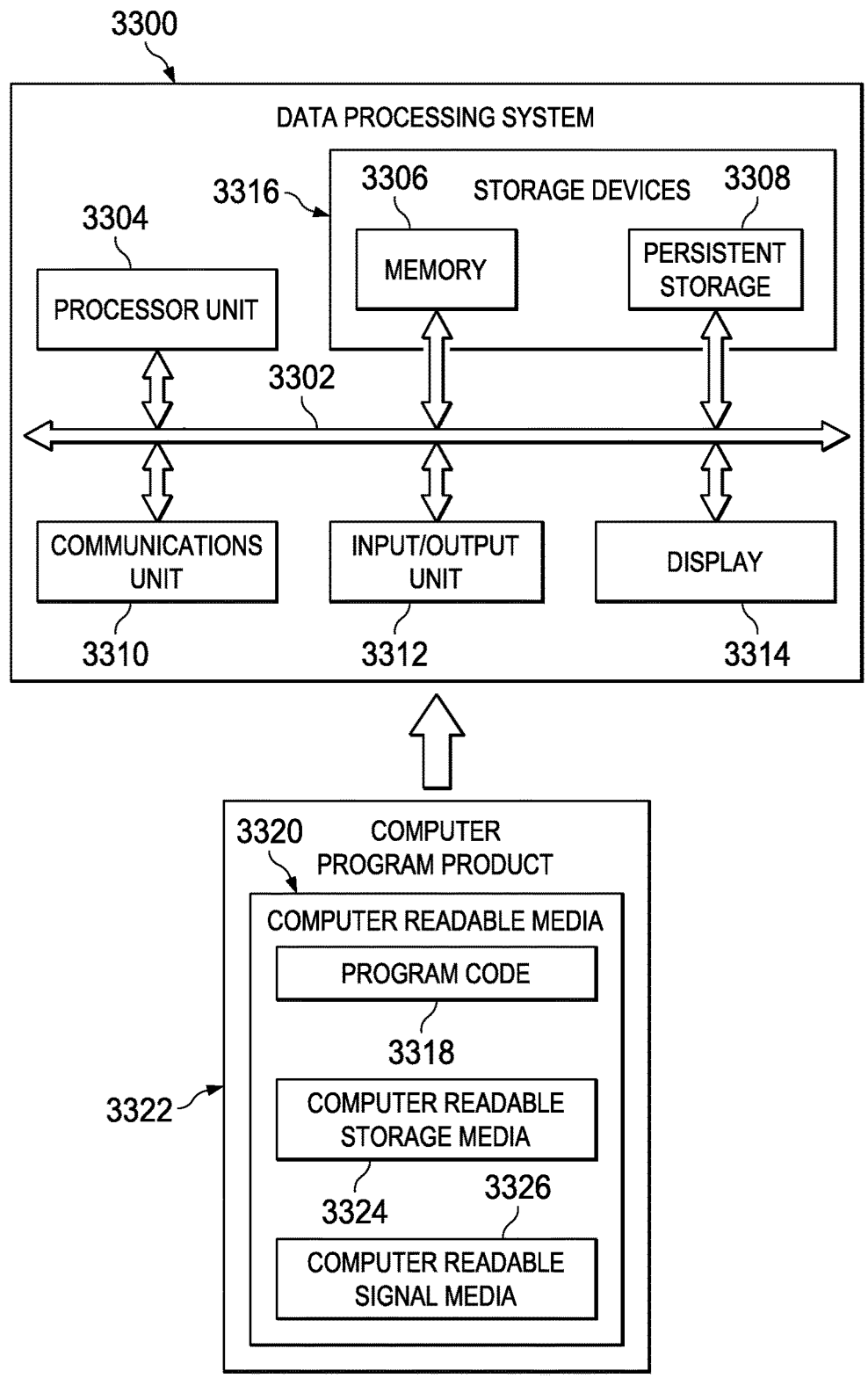
FIG. 33 is an illustration of a block diagram of a data processing system in accordance with an illustrative embodiment.

Turning now to FIG. 33, an illustration of a block diagram of a data processing system is depicted in accordance with an illustrative embodiment. Data processing system 3300 may be used to implement computer system 124, data processing system 122, and client data processing systems 110. In this illustrative example, data processing system 3300 includes communications framework 3302, which provides communications between processor unit 3304, memory 3306, persistent storage 3308, communications unit 3310, input/output (I/O) unit 3312, and display 3314. In this example, communications framework 3302 may take the form of a bus system.

Processor unit 3304 serves to execute instructions for software that may be loaded into memory 3306. Processor unit 3304 may be a number of processors, a multi-processor core, or some other type of processor, depending on the particular implementation.

Memory 3306 and persistent storage 3308 are examples of storage devices 3316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 3316 may also be referred to as computer readable storage devices in these illustrative examples. Memory 3306, in these examples, may be, for example, a random access memory or any other suitable volatile or non-volatile storage device. Persistent storage 3308 may take various forms, depending on the particular implementation.

For example, persistent storage 3308 may contain one or more components or devices. For example, persistent storage 3308 may be a hard drive, a flash memory, a rewritable optical disk, a rewritable magnetic tape, or some combination of the above. The media used by persistent storage 3308 also may be removable. For example, a removable hard drive may be used for persistent storage 3308.

Communications unit 3310, in these illustrative examples, provides for communications with other data processing systems or devices. In these illustrative examples, communications unit 3310 is a network interface card.

Input/output unit 3312 allows for input and output of data with other devices that may be connected to data processing system 3300. For example, input/output unit 3312 may provide a connection for user input through at least of a keyboard, a mouse, or some other suitable input device. Further, input/output unit 3312 may send output to a printer. Display 3314 provides a mechanism to display information to a user.

Instructions for at least one of the operating system, applications, or programs may be located in storage devices 3316, which are in communication with processor unit 3304 through communications framework 3302. The processes of the different embodiments may be performed by processor unit 3304 using computer-implemented instructions, which may be located in a memory, such as memory 3306.

These instructions are referred to as program code, computer usable program code, or computer readable program code that may be read and executed by a processor in processor unit 3304. The program code in the different embodiments may be embodied on different physical or computer readable storage media, such as memory 3306 or persistent storage 3308.

Program code 3318 is located in a functional form on computer readable media 3320 that is selectively removable and may be loaded onto or transferred to data processing system 3300 for execution by processor unit 3304. Program code 3318 and computer readable media 3320 form computer program product 3322 in these illustrative examples. In one example, computer readable media 3320 may be computer readable storage media 3324 or computer readable signal media 3326. In these illustrative examples, computer readable storage media 3324 is a physical or tangible storage device used to store program code 3318 rather than a medium that propagates or transmits program code 3318.

Alternatively, program code 3318 may be transferred to data processing system 3300 using computer readable signal media 3326. Computer readable signal media 3326 may be, for example, a propagated data signal containing program code 3318. For example, computer readable signal media 3326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 3300 are not meant to provide architectural limitations to the manner in which different embodiments may be implemented. The different illustrative embodiments may be implemented in a data processing system including components in addition to or in place of those illustrated for data processing system 3300. Other components shown in FIG. 33 can be varied from the illustrative examples shown. The different embodiments may be implemented using any hardware device or system capable of running program code 3318.

Thus, the illustrative examples provide a method and apparatus for designing web pages. In one illustrative example, a method and apparatus overcome the technical problem of the knowledge and experience about web page servers needed to design web pages.

In another illustrative example, a method and apparatus overcome the technical problem of designing web pages for display on different types of browsers. In the technical solution, the process using the metadata has a technical effect that avoids an operator needing knowledge and experience about a web page server. Additionally, the technical solution provided by this process has a technical effect of reducing the need for the operator viewing a web page on different types of browsers to see whether the web page has a desired display on those browsers.

Thus, the operator designing a web page may focus on designing the web page rather than identifying differences in the manner in which the web page may be displayed on different browsers. In this manner, the operator designing a web page may focus on how the web page should look rather than having to worry about how the web page will be displayed on different browsers or having knowledge about web servers to view or test web pages. Thus, the operator may focus on designing the web page for a particular look, feel, function, or other goal.

Further, when web pages are displayed on a browser on a client data processing system, the display of the web pages may occur more quickly, with less use of web page server resources, more consistently, or some combination thereof. For example, a client data processing system may display web pages more quickly because the web pages are generated on the client data processing system instead of on a web server on a remote computer. In particular, displaying web pages using metadata and content on a client data processing system overcomes the technical problem of having sufficient resources for web page servers to generate web pages. As a result, a technical effect occurs in which web pages are displayed more quickly on client data processing systems.

Additionally, the web pages created for display may take into account political units, such as countries. For example, one version of the web page may be created for a first country while another version of the web page may be created for a second country. These different versions may take into account policies such as laws or regulations that may be different in between the first country and the second country.

In an illustrative example described above, metadata describes the layouts of the web page. The metadata also may describe what objects are to be used for a particular policy of a political unit. As depicted, the political unit may be identified such that the objects used for the web page may be selected based on the identification of the political unit and the metadata describing what objects should be used to meet the policy for the particular political unit.

For example, when the web page includes a view, versions the view may be provided for political units. When the political unit is identified, the web page is created for display using the objects included in the version of the view for the political unit.

In this manner, different versions of a web page do not have to be stored on a web server. As a result, storage space needed may be reduced, solving the technical problem of needing more storage space than desired.

In an illustrative example, the web pages may be generated dynamically on a client data processing system based on an operation to be performed for a particular political unit. The web page may be designed to comply with the policy for the particular political unit, such as a particular country. Thus, one or more of the illustrative examples provide one or more technical solutions that reduce the time and effort needed to provide different versions of web pages to perform operations and have sufficient resources for web page servers to generate web pages.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying a web page, the method comprising:
   receiving, by a client data processing system, metadata describing the web page, wherein the metadata includes a document object model tree that defines what the web page looks like without content for the web page and does not include a markup language document for the web page, wherein the metadata does not include a markup language document or cascading style sheet for the web page, the metadata defines a group of objects in the web page, and an object in the group of objects has a function that meets a policy for a first political unit;
   identifying, by the client data processing system, the content needed for the web page based on the metadata;
   obtaining, by the client data processing system, the content for the web page;
   creating, by the client data processing system, the web page using the metadata and the content; and
   displaying, by the client data processing system, the web page on a graphical user interface on a display system for the client data processing system, enabling a reduction in resources at a web server that are used to display the web page on the client data processing system, enabling a reduction in resources used to display the web page.

2. The method of claim 1, wherein the object in the group of objects has a function that meets the policy for the political unit and the object is used to perform an operation for the political unit.

3. The method of claim 1, wherein the creating step comprises:
   creating the web page using the metadata and the content through a web page generator located on the client data processing system.

4. The method of claim 3, wherein the obtaining step comprises:
   requesting the content by the web page generator on the client data processing system.

5. The method of claim 1, wherein:
   the metadata includes metadata for a grouping of political units; the grouping of the political units identifies a subset of political units in the grouping that are part of other political units in the grouping;
   the grouping includes the first political unit, wherein the grouping identifies that the first political unit is part of a second political unit in the grouping;
   the metadata includes layouts of groups of objects for the political units; and
   the method further comprises:
      identifying the group of objects in the web page from the groups of objects for the political units based on the metadata for the grouping of the political units.

6. The method of claim 5, wherein the another political unit is a default for the political units.

7. The method of claim 6, wherein the political unit and the another political unit are each selected from one of a country, a state, a province, a multinational grouping, a township, or a city.

8. The method of claim 5, wherein the grouping of the political units is selected to meet policies for the political units.

9. The method of claim 8 further comprising:
   displaying graphical objects in a design view, wherein the graphical objects are selectable for use in selecting the grouping of the political units for the web page; and
   generating the metadata for the web page that includes the grouping of the political units based on user input selecting the grouping of the political units for the web page.

10. The method of claim 9 further comprising:
    displaying the graphical objects in the design view, wherein the graphical objects are selectable for use in designing the layouts of the groups of objects for the political units in the grouping of the political units for the web page; and
    generating the metadata for the web page that includes the layouts of the groups of objects for the political units in the grouping of the political units based on user input designing the layouts of the groups of objects for the political units in the grouping of the political units for the web page.

11. The method of claim 5, wherein another object in the group of objects for the web page meets another policy for the another political unit, and further comprising:
    combining a first group of objects for the political unit in the groups of objects with a second group of objects for the another political unit in the groups of objects to form the group of objects for the web page.

12. The method of claim 11, wherein the combining step comprises:
    identifying a portion of the first group of objects for the political unit that does not replace another portion of the second group of objects for the another political unit; and
    generating the group of objects from the first group of objects for the political unit and the another portion of the second group of objects not replaced by the portion of the first group of objects for the political unit, wherein the group of objects for the web page form the first group of objects for the political unit combined with the second group of objects for the another political unit.

13. The method of claim 1, wherein the metadata includes a rule for the object that implements the function that meets the policy for the political unit and further comprising:
    receiving, by the client data processing system, user input to the object on the web page; and executing, by the data processing system, program code that implements the rule for the object when the user input to the object is received.

14. A method for displaying a web page, the method comprising:
receiving, by the data processing system, metadata describing the web page, wherein the metadata includes a document object model tree that defines what the web page looks like without content for the web page and does not include a markup language document or cascading style sheet for the web page, and wherein the metadata defines a group of objects in the web page;
identifying, by the data processing system, the content needed for the web page based on the metadata;
selecting, by the data processing system, a graphical object that performs a function for the web page to meet a policy for a first political unit, wherein the graphical object is selected based on an identification of the first political unit;
creating, by the data processing system, the web page, wherein the webpage has the graphical object in the web page that performs the function to meet the policy, wherein the web page is configured to receive a user input from an operator for an operation performed by the operator with respect to the first political unit; and
displaying the web page on a graphical user interface on a display system for a client data processing system.

15. The method of claim 14, wherein the creating step comprises:
obtaining, by the client data processing system, the content for the web page;
creating, by the client data processing system, the web page using the metadata and the content; and
displaying, by the client data processing system, the web page on the graphical user interface on the client data processing system.

16. A client data processing system comprising:
a display system; and
a web page generator in communication with the display system, wherein the web page generator receives metadata describing the web page, wherein the metadata includes a document object model tree that defines what the web page looks like without content for the web page and does not include a markup language document or cascading style sheet for the web page, the metadata defines a group of objects in the web page, and an object in the group of objects has a function that meets a policy for a first political unit; identifies the content needed for the web page based on the metadata; obtains the content for the web page; creates the web page using the metadata and the content; and displays the web page on a graphical user interface on a display system for the client data processing system, enabling a reduction in resources at a web server that are used to display the web page on the client data processing system, enabling a reduction in resources used to display the web page.

17. The client data processing system of claim 16, wherein the object in the group of objects has a function that meets the policy for the political unit and the object is used to perform an operation for the political unit.

18. The client data processing system of claim 16, wherein:
the metadata includes metadata for a grouping of political units; the grouping of the political units identifies a subset of political units in the grouping that are part of other political units in the grouping;
the grouping includes the first political unit, wherein the grouping identifies that the first political unit is part of a second political unit in the grouping;
the metadata includes layouts of groups of objects for the political units; and
the web page generator identifies the group of objects in the web page from the groups of objects for the political units based on the metadata for the grouping of the political units.

19. The client data processing system of claim 18, wherein the another political unit is a default for the political units.

20. The client data processing system of claim 18, wherein the grouping of the political units is selected to meet the policies for the political units.

21. The client data processing system of claim 20, wherein the web page generator displays graphical objects in a design view, wherein the graphical objects are selectable for use in selecting the grouping of the political units for the web page and generate the metadata for the web page that includes the grouping of the political units based on user input selecting the grouping of the political units for the web page.

22. The client data processing system of claim 18, wherein another object in the group of objects for the web page meets another policy for the another political unit.

23. The client data processing system of claim 22, wherein the web page generator combines a first group of objects for the political unit in the groups of objects with a second group of objects for the another political unit in the groups of objects to form the group of objects for the web page.

24. The client data processing system of claim 23, wherein in combining the first group of objects for the political unit in the groups of objects with the second group of objects for the another political unit in the groups of objects to form the group of objects, the web page generator identifies a portion of the first group of objects for the political unit that do not replace another portion of the second group of objects for the another political unit and generates the group of objects from the first group of objects for the political unit and the another portion of the second group of objects not replaced by the portion of the first group of objects for the political unit, wherein the group of objects for the web page form the first group of objects for the political unit combined with the second group of objects for the another political unit.

25. A computer program product for displaying a web page, the computer program product comprising:
a computer readable storage media;
first program code, stored on the computer readable storage media, for receiving metadata describing the web page, wherein the metadata includes a document object model tree that defines what the web page looks like without content for the web page and does not include a markup language document or cascading style sheet for the web page, the metadata defines a group of objects in the web page, and an object in the group of objects has a function that meets a policy for a political unit;
second program code, stored on the computer readable storage media, for identifying the content needed for the web page based on the metadata;
third program code, stored on the computer readable storage media, for obtaining the content for the web page;

fourth program code, stored on the computer readable storage media, for creating the web page using the metadata and the content; and fifth program code, stored on the computer readable storage media, for displaying the web page on a graphical user interface on a display system for a client data processing system, enabling a reduction in resources at a web server that are used to display the web page on the client data processing system, enabling a reduction in resources used to display the web page.

26. The computer program product of claim 25, wherein:
the metadata includes metadata for a grouping of political units; the grouping of the political units identifies a subset of political units in the grouping that are part of other political units in the grouping; and
the grouping includes the first political unit, wherein the grouping identifies that the first political unit is part of a second political unit in the grouping, and further comprising:
sixth program code, stored on the computer readable storage media, for identifying the group of objects in the web page from the objects based on the metadata for the grouping of the objects.

27. The computer program product of claim 26, wherein the another political unit is a default for the political units.

28. The computer program product of claim 26, wherein the grouping of the objects is selected to meet the policies for the political units.

* * * * *